(12) United States Patent
Adbo et al.

(10) Patent No.: US 7,590,750 B2
(45) Date of Patent: Sep. 15, 2009

(54) SYSTEMS AND METHODS FOR MULTIMEDIA REMOTING OVER TERMINAL SERVER CONNECTIONS

(75) Inventors: Nadim Y. Adbo, Bellevue, WA (US); Adil A. Sherwani, Seattle, WA (US); Alexandre V. Grogorovitch, Redmond, WA (US); Dale A. Sather, Seattle, WA (US); Eduardo P. Oliveira, Redmond, WA (US); Joy Chik, Sammamish, WA (US); Sumedh N. Barde, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 684 days.

(21) Appl. No.: 11/047,362

(22) Filed: Jan. 31, 2005

(65) Prior Publication Data

US 2006/0069797 A1 Mar. 30, 2006

Related U.S. Application Data

(60) Provisional application No. 60/608,786, filed on Sep. 10, 2004.

(51) Int. Cl.
*G06F 15/16* (2006.01)
(52) U.S. Cl. .................................. 709/231; 709/203
(58) Field of Classification Search ......... 709/202–205, 709/217–219, 227–236, 246–247
See application file for complete search history.

(56) References Cited

U.S. PATENT DOCUMENTS

| | | | |
|---|---|---|---|
| 5,140,437 A | 8/1992 | Yonemitsu et al. | |
| 5,420,801 A | 5/1995 | Dockter et al. | |
| 5,528,281 A | 6/1996 | Grady et al. | |
| 5,539,886 A | 7/1996 | Aldred et al. | |
| 5,546,584 A | 8/1996 | Lundin et al. | |
| 5,574,934 A | 11/1996 | Mirashrafi et al. | |
| 5,577,258 A | 11/1996 | Cruz et al. | |
| 5,604,843 A | 2/1997 | Shaw et al. | |
| 5,625,404 A | 4/1997 | Grady et al. | |
| 5,675,752 A | 10/1997 | Scott et al. | |
| 5,712,906 A | 1/1998 | Grady et al. | |
| 5,765,011 A | 6/1998 | Wilkinson et al. | |
| 5,786,814 A | 7/1998 | Moran et al. | |

(Continued)

FOREIGN PATENT DOCUMENTS

EP 0784271 A2 7/1997

(Continued)

OTHER PUBLICATIONS

How Terminal Services Works, Microsoft TechNet, Mar. 28, 2003.*

(Continued)

*Primary Examiner*—Yasin M Barqadle
(74) *Attorney, Agent, or Firm*—Lee & Hayes, PLLC

(57) ABSTRACT

Techniques relating to managing multimedia transmissions in terminal services scenarios are described. In one instance, a method sends a user-interface component from a server to a remote client. The method further streams a media component for presentation on the remote client in combination with the user-interface component and wherein the media presentation is tracked but not displayed by the server.

14 Claims, 7 Drawing Sheets

U.S. PATENT DOCUMENTS

| | | | |
|---|---|---|---|
| 5,802,283 | A | 9/1998 | Grady et al. |
| 5,815,689 | A | 9/1998 | Shaw et al. |
| 5,878,431 | A | 3/1999 | Potterveld et al. |
| 5,886,274 | A | 3/1999 | Jungleib |
| 5,887,139 | A | 3/1999 | Madison, Jr. et al. |
| 5,936,643 | A | 8/1999 | Tindell et al. |
| 5,995,512 | A | 11/1999 | Pogue, Jr. |
| 5,996,015 | A | 11/1999 | Day et al. |
| 6,014,706 | A | 1/2000 | Cannon et al. |
| 6,038,625 | A | 3/2000 | Ogino et al. |
| 6,044,408 | A | 3/2000 | Engstrom et al. |
| 6,178,172 | B1 | 1/2001 | Rochberger |
| 6,185,612 | B1 | 2/2001 | Jensen et al. |
| 6,192,354 | B1 | 2/2001 | Bigus et al. |
| 6,209,041 | B1 | 3/2001 | Shaw et al. |
| 6,243,753 | B1 | 6/2001 | Machin et al. |
| 6,262,776 | B1 | 7/2001 | Griffits |
| 6,263,486 | B1 | 7/2001 | Boezeman et al. |
| 6,266,053 | B1 | 7/2001 | French et al. |
| 6,279,029 | B1 | 8/2001 | Sampat et al. |
| 6,308,216 | B1 | 10/2001 | Goldszmidt et al. |
| 6,317,131 | B2 | 11/2001 | Basso et al. |
| 6,321,252 | B1 | 11/2001 | Bhola et al. |
| 6,343,313 | B1 | 1/2002 | Salesky et al. |
| 6,347,079 | B1 | 2/2002 | Stephens et al. |
| 6,369,835 | B1 | 4/2002 | Lin |
| 6,385,201 | B1 | 5/2002 | Iwata |
| 6,389,467 | B1 | 5/2002 | Eyal |
| 6,430,526 | B1 | 8/2002 | Toll |
| 6,536,043 | B1 | 3/2003 | Guedalia |
| 6,546,426 | B1 | 4/2003 | Post |
| 6,549,932 | B1 | 4/2003 | McNally et al. |
| 6,581,102 | B1 | 6/2003 | Amini et al. |
| 6,594,773 | B1 | 7/2003 | Lisitsa et al. |
| 6,618,752 | B1 | 9/2003 | Moore et al. |
| 6,625,643 | B1 | 9/2003 | Colby et al. |
| 6,658,477 | B1 | 12/2003 | Lisitsa et al. |
| 6,691,312 | B1 | 2/2004 | Sen et al. |
| 6,694,368 | B1 | 2/2004 | An et al. |
| 6,711,171 | B1 | 3/2004 | Dobbins et al. |
| 6,725,274 | B1 | 4/2004 | Slik |
| 6,725,279 | B1 | 4/2004 | Richter et al. |
| 6,757,735 | B2 | 6/2004 | Apostolopulos et al. |
| 6,802,019 | B1 | 10/2004 | Lauder |
| 6,810,526 | B1 | 10/2004 | Menard et al. |
| 6,823,225 | B1 | 11/2004 | Sass |
| 6,957,430 | B2 | 10/2005 | Fant et al. |
| 7,024,483 | B2 | 4/2006 | Dinker et al. |
| 7,035,858 | B2 | 4/2006 | Dinker et al. |
| 7,047,554 | B1 | 5/2006 | Lortz |
| 7,124,424 | B2 | 10/2006 | Gordon et al. |
| 7,139,925 | B2 | 11/2006 | Dinker et al. |
| 7,197,535 | B2 | 3/2007 | Salesky et al. |
| 7,206,854 | B2 | 4/2007 | Kauffman et al. |
| 7,240,325 | B2 | 7/2007 | Keller |
| 7,299,485 | B2 | 11/2007 | Chaney et al. |
| 7,415,537 | B1 | 8/2008 | Maes |
| 7,426,637 | B2 | 9/2008 | Risan et al. |
| 2002/0051017 | A1* | 5/2002 | Wishoff ...................... 345/774 |
| 2002/0099842 | A1 | 7/2002 | Jenning |
| 2002/0158897 | A1 | 10/2002 | Besaw et al. |
| 2002/0199031 | A1 | 12/2002 | Rust et al. |
| 2003/0033424 | A1 | 2/2003 | Gould |
| 2003/0056029 | A1 | 3/2003 | Huang et al. |
| 2003/0093568 | A1* | 5/2003 | Deshpande ................. 709/247 |
| 2003/0095504 | A1 | 5/2003 | Ogier |
| 2003/0101253 | A1 | 5/2003 | Saito et al. |
| 2003/0149772 | A1 | 8/2003 | Hsu et al. |
| 2003/0158957 | A1* | 8/2003 | Abdolsalehi ................ 709/231 |
| 2003/0177292 | A1 | 9/2003 | Smirnov et al. |
| 2003/0215214 | A1 | 11/2003 | Ma |
| 2003/0231867 | A1 | 12/2003 | Gates et al. |
| 2003/0236906 | A1 | 12/2003 | Klemets et al. |
| 2004/0001106 | A1 | 1/2004 | Deutscher et al. |
| 2004/0042413 | A1 | 3/2004 | Kawamura et al. |
| 2004/0073596 | A1 | 4/2004 | Kloninger et al. |
| 2004/0073912 | A1 | 4/2004 | Meza |
| 2004/0080504 | A1 | 4/2004 | Salesky et al. |
| 2004/0139157 | A1 | 7/2004 | Neely et al. |
| 2004/0177162 | A1 | 9/2004 | Wetzel et al. |
| 2004/0207723 | A1* | 10/2004 | Davis et al. ............... 348/14.04 |
| 2004/0208132 | A1 | 10/2004 | Neulist et al. |
| 2004/0220926 | A1 | 11/2004 | Lamkin et al. |
| 2004/0236945 | A1 | 11/2004 | Risan et al. |
| 2004/0267778 | A1 | 12/2004 | Rudolph et al. |
| 2004/0267953 | A1 | 12/2004 | Dunbar et al. |
| 2004/0268224 | A1 | 12/2004 | Balkus et al. |
| 2004/0268357 | A1 | 12/2004 | Joy et al. |
| 2004/0268407 | A1 | 12/2004 | Sparrell et al. |
| 2005/0005025 | A1 | 1/2005 | Harville et al. |
| 2005/0018775 | A1 | 1/2005 | Subramanian et al. |
| 2005/0055517 | A1 | 3/2005 | Olds et al. |
| 2005/0066082 | A1 | 3/2005 | Forin et al. |
| 2005/0081158 | A1* | 4/2005 | Hwang ....................... 715/740 |
| 2005/0125734 | A1 | 6/2005 | Mohammed et al. |
| 2005/0132168 | A1* | 6/2005 | Weiss et al. ................. 712/203 |
| 2005/0172309 | A1 | 8/2005 | Risan |
| 2005/0188311 | A1 | 8/2005 | Diesel et al. |
| 2005/0198189 | A1* | 9/2005 | Robinson et al. ............ 709/217 |
| 2005/0226324 | A1 | 10/2005 | Ouyang et al. |
| 2005/0262254 | A1* | 11/2005 | Sherwani .................... 709/231 |
| 2008/0037957 | A1 | 2/2008 | Nallur et al. |
| 2008/0154407 | A1 | 6/2008 | Carson |

FOREIGN PATENT DOCUMENTS

| | | | |
|---|---|---|---|
| EP | 0814403 | A1 | 12/1997 |
| JP | 2002514797 | T | 5/2002 |
| WO | WO9621189 | A1 | 7/1996 |
| WO | WO9957837 | A2 | 11/1999 |

OTHER PUBLICATIONS

A Primitive Window System Using GDI+ and C#, printed from the Jun. 5, 2002 archive of http://www.csharphelp.com/archives2/archive306.html.*

Chien, et al., "Multiple Sprites and Frame Skipping Techniques for Sprite Generation with High Subjective Quality and Fast Speed" IEEE 2002 pp. 785-788.

Chung, et al., "A Control and Data Abstraction Approach for Multimedia Presentation" Journal of Chinese Institute of Electrical Engineering vol. 5 No. 3 pp. 265-276 1998.

Engel et al., "Combining Local and Remote Visualization Techniques for Interactive Volume Rendering in Medical Applications" website at http://www.vis.informatick.uni-stuttgart.de/eng/research/pub/pub2000/engel_vis-00.pdf.

Engel et al., "Remote 3D Visualization Using Image-Streaming Techniques" website at http://citseer.nj.nec.com/394248.html 4 pages.

Girod, et al., "Feedback-Based Error Control for Mobile Video Transmission"; Proceedings of the IEEE v87 n10 Oct. 1999 pp. 1707-1723.

Lee, et al., "Open Multimedia/Hypermedia Application Development Environment" Inspec 1996.

Olson, et al., "Remote Rendering Using Vtk and Vic" website at http://www-unix.mcs.anl.gov/fl/publications/vis00-vicvtk.pdf 2 pages, Sep. 2000.

Robertson, et al., "Temporal Resolution Enhancement in Compressed Video Sequences";University of Notre Dame Notre Dame Indiana Sep. 2001 pp. 1-11.

Samejo, et al., "Graphical User Interface Based Multimedia Web Suite in Windows Environment" Mehran university Research Journal of Engineering & -Technology vol. 20 No. 2 pp. 57-68 Apr. 2001.

Shih, et al., "A Knowledge Abstraction Approach for Multimedia Presentation" IEEE pp. 528-532 1997.

Shih, et al., "A Stepwise Refinement Approach to Multimedia Presentation Designs" IEEE pp. 117-122 1997.

Shih, "Participator Dependent Multimedia Presentation" Journal of Information Sciences vol. 107 pp. 85-105 1998.

Sullivan, et al., "Programming with the Java Media Framework", Sean C. Sullivan, Loren Winzeler, Jeanine Deagen, and Deanna Brown, 1998, pp. 99.

TGS website at http://www.tgs.com/pro_div/oiv_overview.htm "Open Inventor from TGS4.0 Open Inventor Overview" printed Apr. 28, 2003 4 pages.

Chatterjee, et al., "Microsoft DirectShow: A New Media Architecture", SMPTE Journal, Dec. 1997, pp. 865-871.

Cline, et al., "DirectShow RTP Support for Adaptivity in Networked Multimedia Applications", IEEE, 1998, pp. 13-22.

Dunn, et al., "The Design and Implementation of JaDiSM", Nov. 13, 2007, pp. 38.

Agarwal, et al., "The Totem Multiple-Ring Ordering and Topology Maintenance Protocol", ACM, vol. 16, No. 2, 1998, pp. 93-132.

Bao, et al., "Topology Management in Ad Hoc Networks", ACM, 2003, pp. 129-140.

Jaffe, et al., "Automatic Update of Replicated Topology Data Base", ACM, 1984, pp. 142-148.

Barth, et al., "Configuring Distributed Multimedia Applications Using CINEMA", retrieved on Jan. 19, 2008 at <<http://ieeexplore.ieee.org/xpls/absprintf.jsp?amumber=557748>> Published 2006, pp. 10.

Notice of Rejection from the Japanese Patent Office for Application No. 2005-507640, mailed on Jan. 27, 2009, 13 pgs.

* cited by examiner

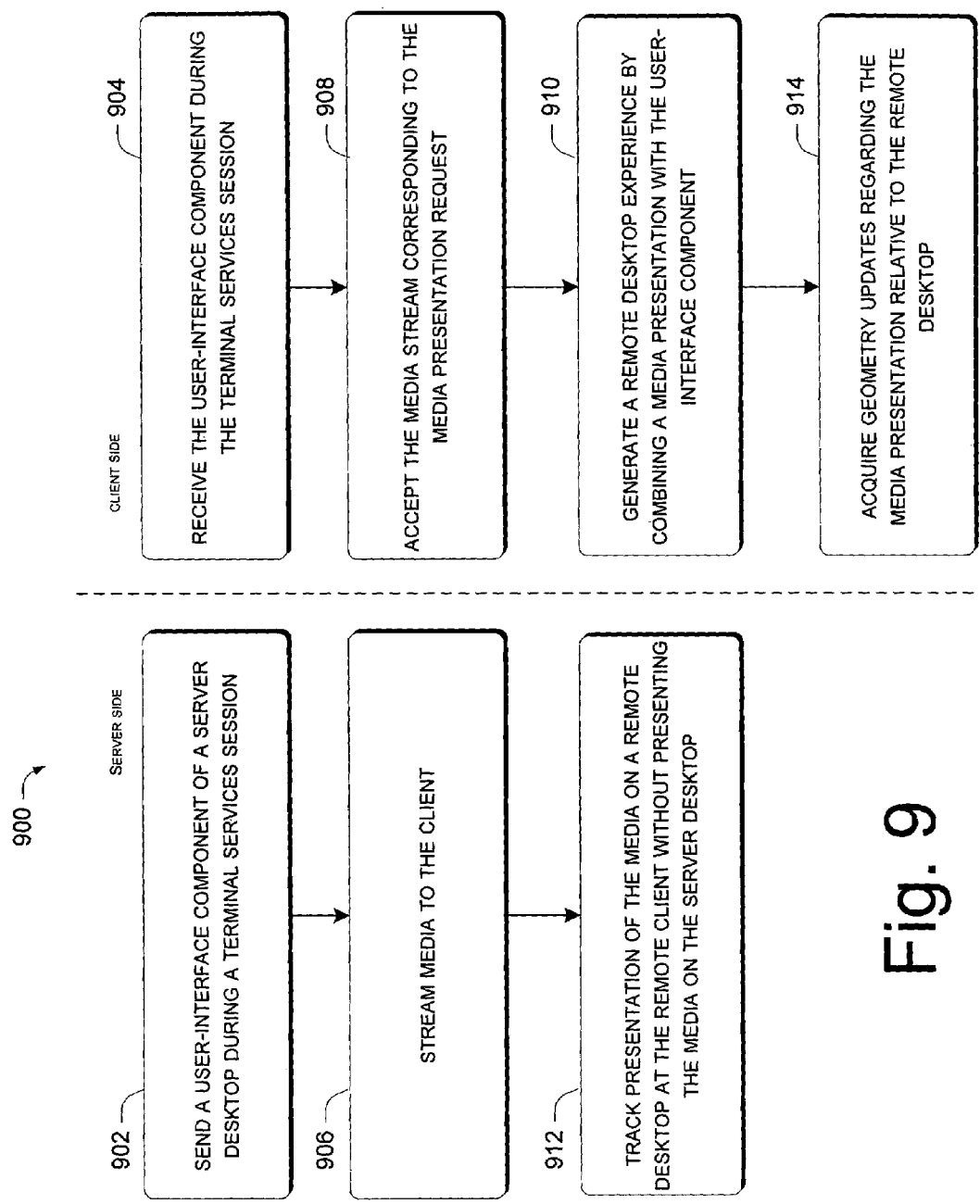

SYSTEMS AND METHODS FOR MULTIMEDIA REMOTING OVER TERMINAL SERVER CONNECTIONS

RELATED APPLICATION

This application claims priority to U.S. Provisional Application Ser. No. 60/608,786, filed Sep. 10, 2004, entitled "System and Method For Multimedia Remoting Over Terminal Services Connections" to Abdo et al., the disclosure of which is incorporated by reference herein.

TECHNICAL FIELD

In general, the present invention relates to computer software and communication networks, and in particular, to a system and method for managing multimedia transmissions to terminal services connections.

BACKGROUND

Terminal Services provides for a desktop remoting experience where a client such as a thin-client, or a rich client can connect remotely over a network to another computer, which functions as a server computer to achieve a remote desktop experience. In this scenario, the applications run on the server, remoting just their 'output' (i.e. graphics or user-interface) to the client over the network.

Previously, if the user tried to play media such as videos or music over a terminal server connection they experienced a degraded user experience. For instance, video was transferred over from the server to the client very inefficiently as a sequence of bitmaps, which do not compress very well. This resulted in huge bandwidth consumption and very slow playback e.g. a 24 FPS (frames per second) video may play back as a 2 FPS video over a relatively fast network connection, such as digital subscriber line (DSL), if played in the existing terminal services scenario. Another factor which contributed to the degraded user experience is that no provisions are made for synchronizing the audio and the video stream at the client device, resulting in visible problems such as loss of lip-sync in videos involving "talking". The graphics are traditionally remoted over a remote desktop protocol (RDP). Some existing techniques utilized a minimal audio remoting solution in RDP but did not produce a desired user experience. For example, prior solutions had a set configuration with which streaming had to conform, thereby affecting various performance parameters and system applications.

SUMMARY

The methods and systems described below relate to managing multimedia transmissions in terminal services scenarios. In one instance, a method sends a user-interface component from a server to a remote client. The method further streams a media component for presentation on the remote client in combination with the user-interface component. The media presentation is tracked but not displayed by the server.

BRIEF DESCRIPTION OF THE DRAWINGS

FIG. 9 illustrates a flow diagram for managing multimedia transmissions in terminal services scenarios.

DETAILED DESCRIPTION

Overview

The methods and systems described below relate to managing multimedia transmissions in terminal services scenarios.

One terminal services scenario involves a first computing device networked to a second computing device such that the first computing device functions as a server and the second computer functions as a client. A user on the client is able to see a representation of a desktop (hereinafter "remote desktop") of the server on the client via a terminal services session. The terminal services session allows a user at the client to see and interact with the remote desktop as though the user was sitting in front of the server and viewing the server desktop. User commands at the remote desktop are relayed to the server where the commands can cause various actions to be taken at the server.

Figure 1:
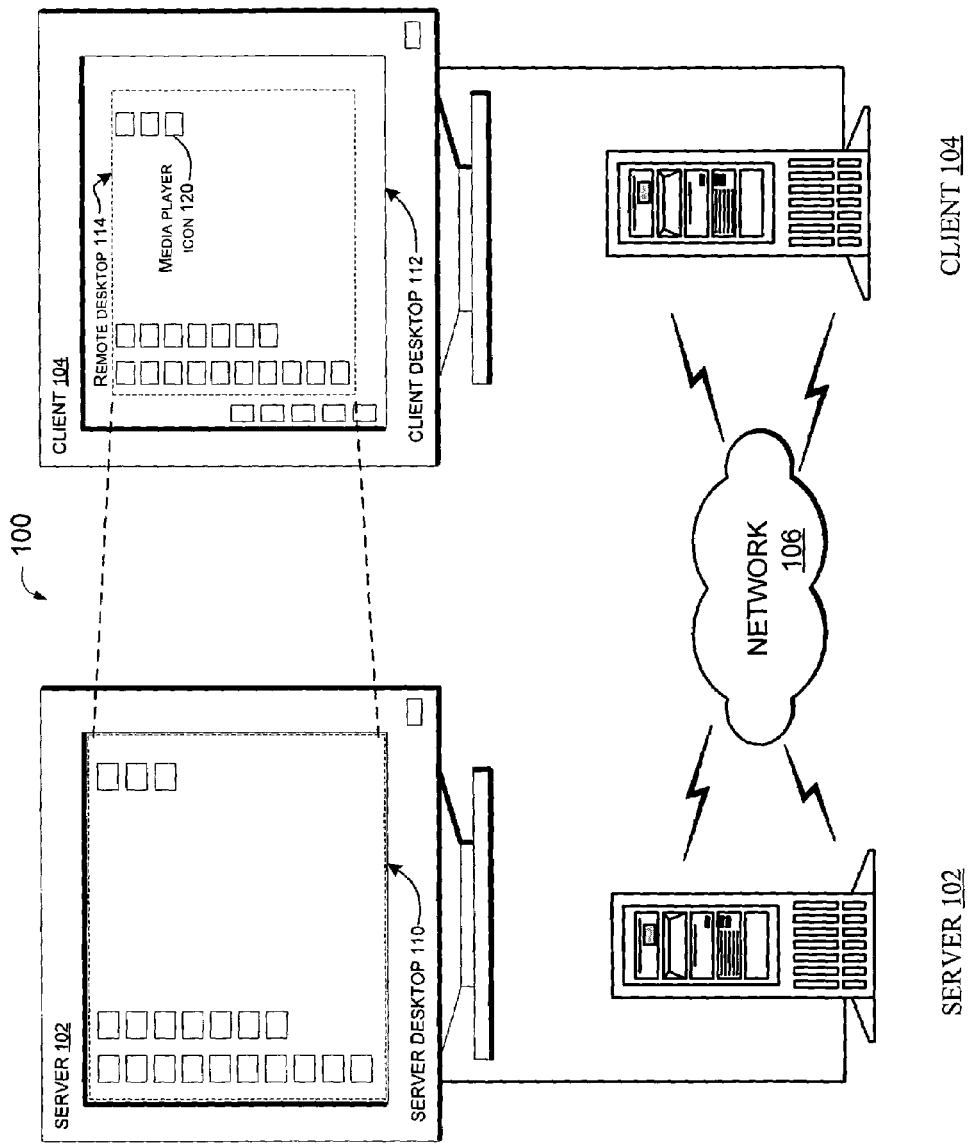
FIGS. 1-5 illustrate a system for managing multimedia transmissions in terminal services scenarios.

For instance, and by way of example, consider FIGS. 1-4. FIG. 1 illustrates an operating environment 100 which includes server 102 coupled to a client 104 via a network 106. A server desktop 110 can be displayed on server 102. Similarly, a client desktop 112 can be displayed on client 104. A terminal services session can allow a remote desktop 114 representing the server desktop to be generated on the client's desktop 112.

Figure 2:
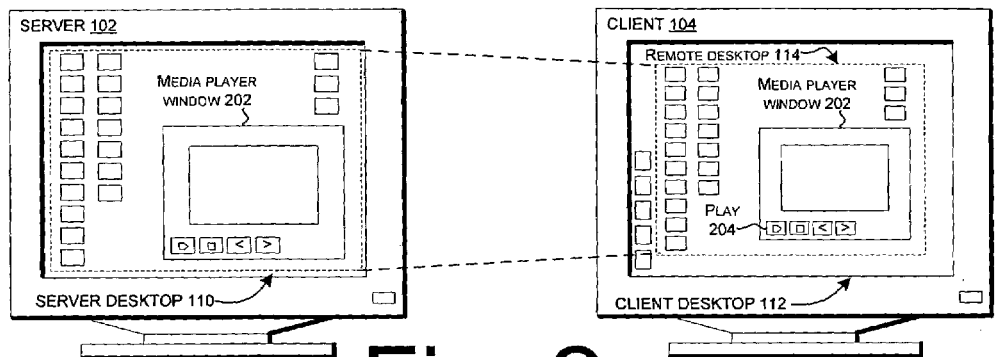

Assume that a user at client device 104 wants to see a media presentation and clicks on a media player icon 120 on the remote desktop. The terminal services session then relays the user's command to the server. As illustrated in FIG. 2, responsive to the user command, the media player application is opened and media player window 202 corresponding to the media player icon is opened on the server desktop 110. The updated server desktop is transmitted, such as in a bit map format, to the client which then updates remote desktop 114.

A user may issue a media presentation command, such as by clicking on a play button 204, on remote desktop 114. The presentation command is sent back to server 102. Upon detecting the presentation command, the server may locate media associated with the presentation command. Rather than processing the media to create an image on the server's desktop, the server transmits the media to the client device in an unprocessed or only partially processed form.

Figure 3:
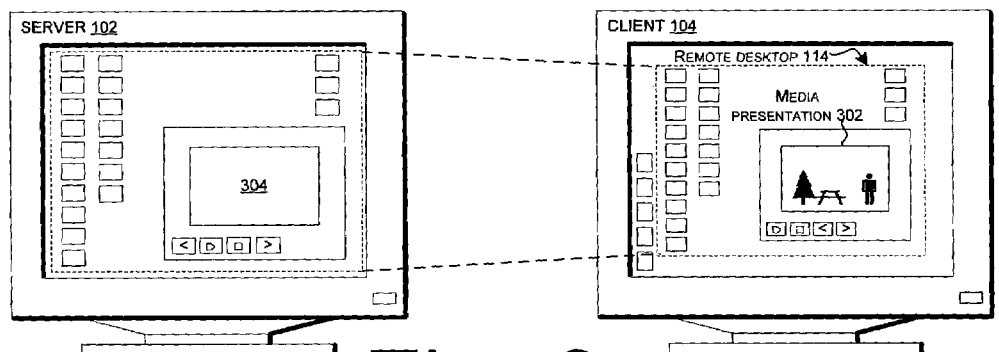

As can be appreciated from FIG. 3, the client processes the media and generates a media presentation 302 on the remote desktop 114. In this instance, the media presentation 302 corresponds to a media presentation window or video render window which is situated within the media player window. The server meanwhile tracks the media presentation, but does not generate the associated images on the server desktop. In some instances, the server may be thought of as creating a placeholder 304 which corresponds to the media presentation window on the client and which can be tracked relative to the remainder of the remote desktop. Tracking provides a notification system for actions and/or events which affect the media presentation 302.

Figure 4:
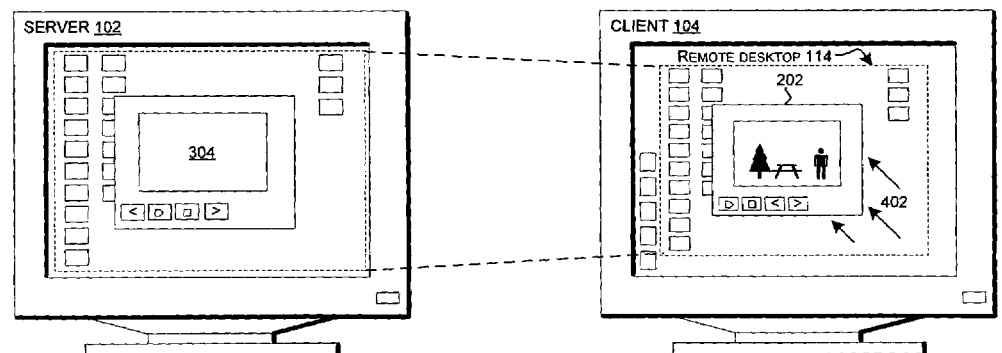

FIG. 4 illustrates one such example where, as indicated generally at 402, a user drags the media player window 202 to a different region of the remote desktop. The position changes are tracked and sent to the server which updates the server desktop. The changes are also reflected on the server's placeholder 304. The changes to the placeholder are tracked on the server and relayed to the client such that the location of the media presentation can be correspondingly updated. In another example, if another window is opened on the server desktop over a portion of the media presentation, then this information is conveyed between the server and the client such that the remote desktop with the media presentation reflects the new condition. This feature is referred to below as geometry tracking.

Geometry tracking is a feature of terminal services that provides a notification system for window geometry changes. Whenever a window's geometry changes, events containing the new geometry will be generated and sent to notification sinks at the source. In this instance, the client acts as the source. Window geometry can change when a window is moved, minimized/maximized, or clipped by another window.

Geometry tracking is used in scenarios where an application or framework is made aware of a terminal services session and is distributed across the client and server. One such scenario can occur when an application decides to render media on the client instead of transmitting a pre-rendered bitmaps from the server. In order to do this, the application creates a window on both the server and client ends. The server window acts as a placeholder, and is able to accept all input, and the actual media would be rendered and painted by the application on the client end. The client window is painted right over the server window for the distribution to be transparent to the user. Since all input actually acts upon the server window, geometry changes will be reflected at the server. The application tracks these changes to the server window and updates the client window accordingly for both windows to be geometrically synchronized.

The above implementation generates a remote desktop by bifurcating data delivery relating to the remote desktop. Relatively low data-intensive components of the server desktop are processed on the server and then transmitted to the client. Relatively highly data-intensive components are transmitted to the client in an unprocessed or less processed form. The processing is then completed by the client and combined with the low data intensive components to create the remote desktop. Events which affect the media presentation are tracked at the server so that a relative relationship of the media presentation to other portions of the remote desktop can be maintained. In this example, media presentation 302 is a relatively dynamic, relatively highly data intensive component, while the remainder of the remote desktop is a relatively static, relatively low data intensive component. Streaming the media component to the client in a compressed and unprocessed form creates an enhanced user experience and/or saves system resources to name but a few potential advantages.

The above implementations described in relation to FIGS. 1-4 are but examples of potential implementations. Other exemplary implementations are described below. Further, for purposes of explanation, the server desktop is illustrated as being displayed as a visual image in FIGS. 1-4. In many implementations, the server desktop may not actually be displayed, e.g. the implementations would work satisfactorily even if the server altogether lacked a display means.

The concepts described above and below can improve a user-experience involving a remote desktop experience involving media playback and/or other similar high data consumption actions by allowing the media infrastructure on the system, e.g. such as a Media Foundation API set or other media platform, to detect that the media infrastructure is running in a terminal services session and to efficiently stream the compressed media to the client before it is decompressed at the server. This results in the following advantages, among others. First, the bandwidth savings are dramatic, a 300 Kbps media stream consumes about 300 Kbps to stream, as it is sent down before decompressing. Previously, the resulting decompressed sequence of bitmaps may have taken several megabits to stream. Second, audio/video sync is maintained as timing information that allows the media playback components at the client to preserve synchronization remain in the streams. This allows for excellent synchronization of audio and video. Third, this technique works for both AV (audio/video) streams or streams that consist of just audio or just video.

Several techniques are described in more detail below. For instance, various implementations allow transparent efficient media streaming in terminal services, without changing the media application. The applications do not need to be aware of the terminal services session or associated processes. Instead the applications run as they would if there was no remote desktop. Further, general applications, such as media players can gain access to the uncompressed stream down in the media playback infrastructure. In contrast to prior scenarios, various techniques described below allow for 'transparent' media streaming with any application running in a terminal server session as long as the application uses appropriate Media API's (e.g. media foundation or other media platforms).

Various implementations described below further allow geometry synchronization. For instance, these implementations allow seamless integration of a media stream playing back at the client with the rest of the RDP display surface. For instance, a media stream's target window can be moved around, clipped or have a size of the target window changed on the server and still result in a seamless integration. Past solutions have been more limited in scope e.g. only allowing the media window to take on one or two 'valid' positions. In some implementations of this solution any transforms of the media window are allowed.

The implementations described above and below are described in the context of a computing environment as commonly encountered at the present point in time. Various examples can be implemented by computer-executable instructions or code means, such as program modules, that are executed by a computer, such as a personal computer or PC. Generally, program modules include routines, programs, objects, components, data structures and the like that perform particular tasks or implement particular abstract data types.

Various examples may be implemented in computer system configurations other than a PC. For example, various embodiments may be realized in hand-held devices, multiprocessor systems, microprocessor-based or programmable consumer electronics, network PCs, minicomputers, mainframe computers, cell phones and the like. Further, as technology continues to evolve, various implementations may be realized on yet to be identified classes of devices. For example, as the cost of a unit of processing power continues to drop and wireless technologies expand, computing devices resembling today's cell phones may perform the functionalities of today's PC, video camera, cell phone, and more in a single mobile device. This single device may in one scenario act as a server and in another scenario act as a client. This is but one of many existing and developing examples for the described implementations.

Various examples may be practiced in distributed computing environments, where tasks are performed by remote processing devices that are linked through a communications network. In a distributed computing environment, program modules may be located in both local and remote memory storage devices. Further, the terms server and client as used herein do not connotate any relative capabilities of the two devices. The client may have more, less, or equal processing capabilities than the server. Rather, in this document, the names server and client describe the relative relationship of the two components. For example, a computing experience of a first or server device is remoted to a second or client device. Further, for ease of explanation the examples provided in this document relate to a single server and a single client. However, this is but one potential configuration. For instance, other implementations may have one server and multiple clients. Further, in some implementations a first computer may act as a server for a second computer which then acts as a server for a third computer.

Although the various implementations may be incorporated into many types of operating environments as suggested above, a description of but one exemplary environment appears in FIG. 8 in the context of an exemplary general-purpose computing device and which is described in more detail later in this document under the heading "Exemplary Operating Environment".

Exemplary Implementations and Processes

Figure 5:
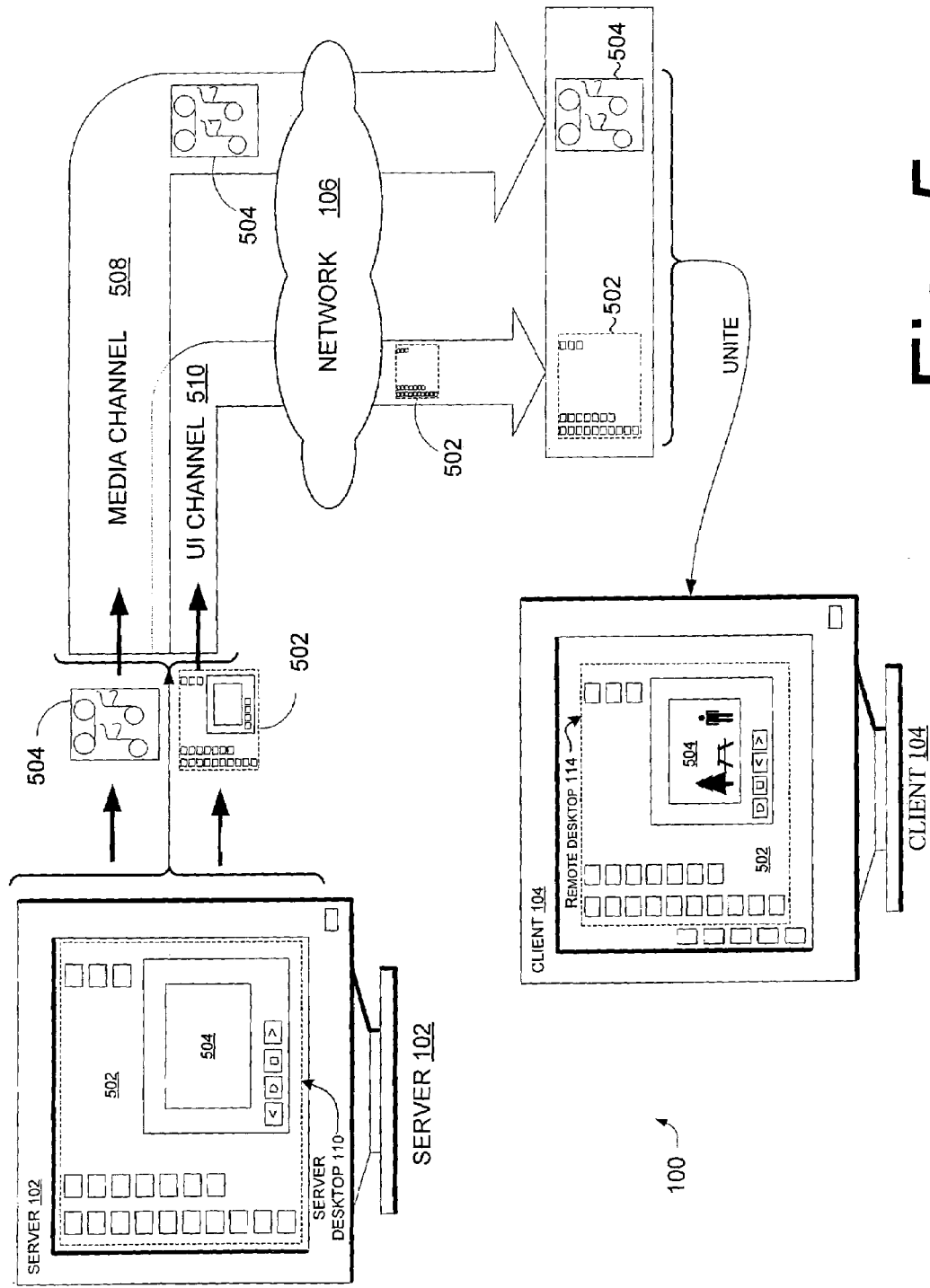

FIG. 5 provides a high-level overview of an exemplary operating environment 100 suitable for managing multimedia transmissions in a distributed environment such as a terminal services or remote desktop protocol (RDP) scenario. In this implementation, server 102 sends data relating to the server's desktop 110 to client 104 to generate a remote experience, such as remote desktop 114, at client 104. In this instance remote desktop 114 includes a user-interface component 502 and a media component 504.

User-interface-component 502 includes graphics and images that typically compose a user-interface. User-interface component 502 includes icons, host audio, background images and applications such as word-processing applications, spreadsheet applications, database applications, media applications and so forth. Virtually any components that are not media components are part of user-interface component 502. When compared to the media component, the user-interface component is relatively static and relatively low data-intensive.

Media component 504 includes media-rich or bandwidth-intensive elements that compose a media presentation or media event. The media component is relatively dynamic and relatively highly data-intensive when compared to the user-interface component. The following is a non-exhaustive list of exemplary media components: a streaming media presentation, including a video and/or audio presentation; a television program, including a cable television (CATV), satellite, pay-per-view, or broadcast program; a digitally compressed media experience; a radio program; a recorded media event (sourced by a VCR, DVD player, CD player, Personal Video Recorder and the like); a real-time media event; and a camera feed.

The data for the remote desktop is sent from server 102 to client 104 over network 106. The remote desktop data is bifurcated at the server 104 with data relating to user interface component 502 transmitted over user-interface channel 506 and data relating to media components 504 transmitted over media channel 508.

User-interface channel 506 communicates user-interface component 502 to client 104. Terminal Server and Terminal Client Services, offered by Microsoft Corporation of Redmond, Wash., provide an exemplary user-interface channel 506. Any remotable protocol can be used to transmit data through user-interface channel 506. Exemplary protocols and data formats include, remote desktop protocols (RDP), the T-120 series protocol or HTML (hypertext markup language and its many variations), among others.

Media channel 508 is separate from user-interface channel 506. Media channel 508 is used to transmit bandwidth-intensive experiences such as video and others listed above. Media channel 508 provides a communications conduit for media component 504 to flow separately from user-interface component 502. Thus, the media component 504 is sent out of band with respect to the user-interface component, but synchronized. An exemplary protocol to transmit data through media component 508 includes, but is not limited to, Transmission Control Protocol (TCP), and a virtual channel over an RDP connection.

In each of the scenarios mentioned above, user-interface component 502 is combined with media component 504 to generate remote desktop 114 at the client 104. A user at client 104 can remotely operate server 102 by interacting with remote desktop 114. For instance, the user can move his/her mouse cursor over an application on the remote desktop and open an application by clicking on a corresponding icon. Similarly, the user can issue commands to an application through the remote desktop. For instance, in relation to a media application, the user may utilize mouse clicks to play, stop, fast forward, and rewind. Further, the user can minimize an application window, move the window or open a second application over the first application. Such changes are tracked by the geometry tracking feature described above and below.

For purposes of explanation, the examples described above include an easily discernable user-interface component and an easily discernable media component. Such however need not be the case. For instance, in one example, the media component may occupy the entire client display such that the user does not perceive the user-interface component. Alternatively or additionally, the user-interface component may be visible to the user on the client display only intermittently. For instance, the media component may occupy the entire client display until such time as the user enters a command such as "pause". The word "pause" and/or an associated symbol may then appear in combination with the media component so that the word "pause" appears superimposed over the media component to the user. The skilled artisan should recognize these examples as illustrations of many possible configurations.

Figure 6:
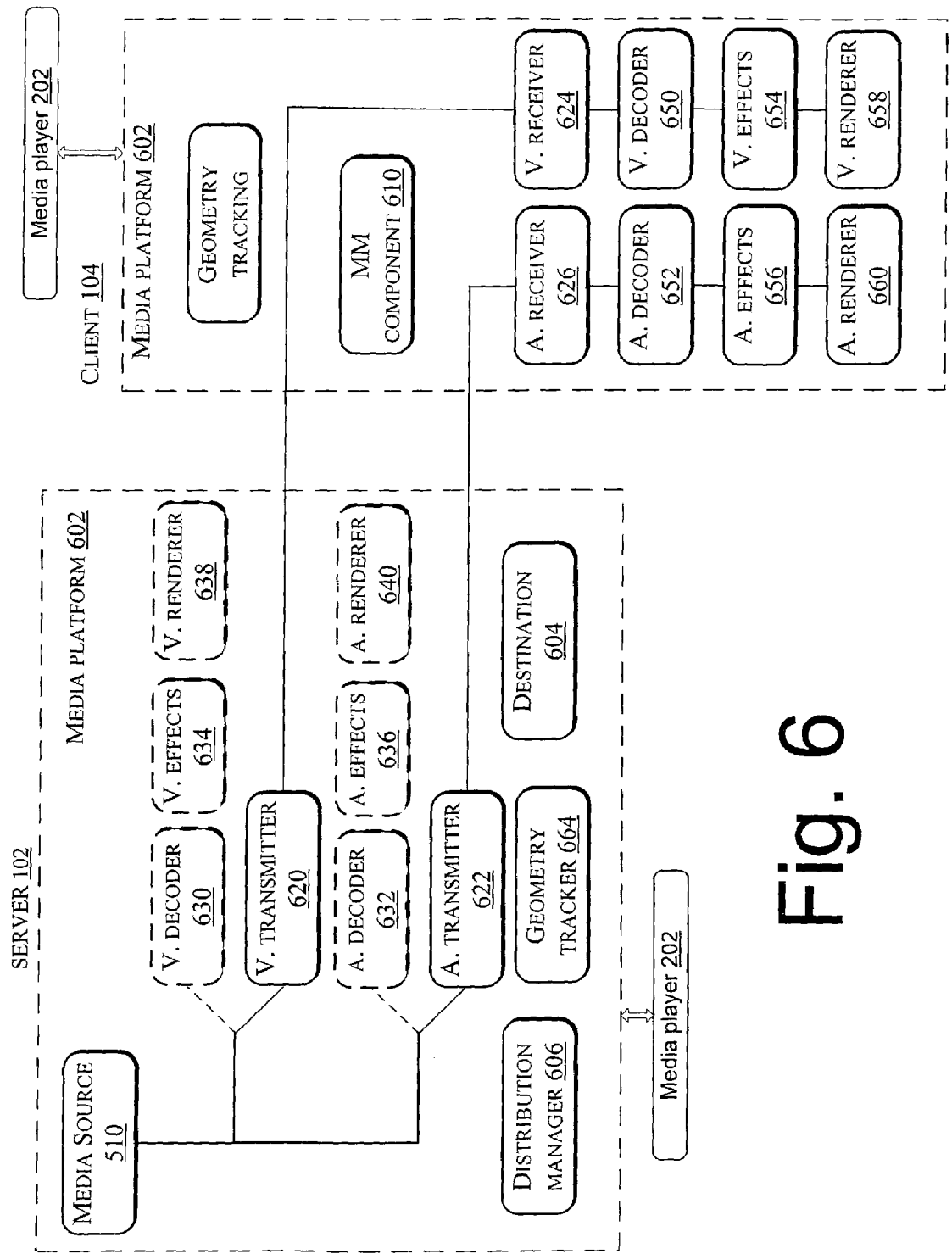
FIG. 6 illustrates portions of an exemplary system for managing multimedia transmissions in terminal services scenarios in more detail.

FIG. 6 represents selective components of system 100 for generating an enhanced remote desktop experience. FIG. 6 relates to a media component of a terminal services session between client 104 and server 102. In this particular instance, the terminal services session entails a remote desktop protocol (RDP) configuration, examples of which are illustrated above.

A media platform 602 operates on server 102 and similarly a version of media platform 602 operates upon client 104. The media platform exists as part of an operating system of an individual device such as server 102 and/or client 104 to allow playback of media such that applications, such as media player 202, that interact with the operating system may control playback of media without "knowing" the particular details of the media formats. The media platform running on the server may be identical to the media platform running on the client. In other instances the media platform on the server may be a different product and/or version than the media platform operating on the client.

In this instance media platform 602 running on server 102 can detect that the media platform is running in a terminal server session via a destination component or destination 604. The destination is an object that defines where a presentation is to be presented (e.g. a window, disk file, and the like) and what happens to the presentation. Further, the source's media platform 602 determines that the source is connected to a client that has the capabilities to render media locally. In this instance, a distribution manager component or distribution manager 606 determines that the source's media platform is connected to client 104 that has the capabilities to render media locally. Distribution manager 606 further establishes terminal services policies to enable remoting media to the client 104. Distribution manager 606 establishes a virtual channel connection with a multimedia client plugin or multimedia component 610. The virtual channel connection allows for the exchange of control information relating to the terminal services session between the source 102 and the client 104.

Communications over the virtual channel connection between the distribution manager 606 and the multimedia component 610 allow supported media formats to be negotiated between the source and the client. Further, utilizing the virtual channel connection allows the distribution manager 606 and the multimedia component 610 to establish a distributed topology. Examples of such techniques are described in more detail in a patent application of the present assignee, titled "Resolving a Distributed Topology To Stream Data" filed on Jul. 11, 2003, and which is incorporated by reference herein.

The distributed topology performs various functionalities. For example, the distributed topology can insert a network transmitter at the server side and a network receiver at the client side. The network receiver is connected in turn to audio and/or video renderers at the client side. In this particular configuration a video transmitter 620 and an audio transmitter 622 are illustrated on server 102 while a corresponding video receiver 624 and an audio receiver 626 are illustrated on the client side.

During a remote desktop media presentation scenario, media can be directed to the client in an unprocessed or partially processed form which is streamed to client 104. For instance, at server 102, media foundation 602 can intercept media that would otherwise be processed at the server, such as by server video decoder 630, server video effect 632, server video renderer 634, server audio decoder 636, server audio effects 638 and server audio renderer 640. The media is redirected to the respective video and audio transmitters 620, 622 for streaming to client 104. Streaming may be over various channels. For instance, the media may be streamed in band with the RDP over a virtual channel. Such a configuration re-uses the existing RDP connection and allows RDP to handle various details of punching thru firewalls, and establishing a secure, authenticated context, among other tasks. Alternatively or additionally, the media may be streamed over a side-band user datagram protocol (UDP) or transmission control protocol (TCP) connection. In some instances an out of band configuration may be more performant. For instance, in a particular configuration, an out of band connection may be available with greater bandwidth than is available in that particular instance through the RDP.

On the client side, the streamed media is received at the multimedia component 610 which in turn passes it to video and audio receivers 624, 626. The video and audio receivers pass the media to the client-side transforms and sinks, which in this illustrated configuration comprise client video decoder 650, client video effect 652, client video renderer 654, client audio decoder 656, client audio effects 658 and client audio renderer 660. The media is then decoded and rendered at the client. Since the audio and video are streamed in their encoded form, any synchronization tools contained in the encoded media will be available at the client to maintain proper audio video synchronization. For ease of explanation, unprocessed media is streamed from the server to the client in this example. However, some processing of the media may occur in other implementations. For instance, assume that consistent with the above described remote desktop scenario, a user requests to play media which is encoded at the source in hypothetical codec 'AA'. Assume further, that the source contains the components to decode hypothetical codec AA, but the client does not, but that both the source and the client have codec capability for a second hypothetical codec format 'BB'. In such an instance, the source may decode the media and then recode the media into BB format before streaming the media to the client. This is but one example, which represents various levels of processing to the media which may occur at system components consistent with the concepts described above and below.

A geometry tracking component or geometry tracker 664 can register and track any changes relating to a target window of the terminal services session. For instance, geometry tracker 664 can register a unique identifier for a target window and track the target window on the remote desktop described above. The geometry tracker tracks changes relating to clipping of the target window by another window, position of the target window, and size of the target window at the server side. These changes are then relayed to the client-side by the remote desktop protocols where the changes are directed to the client side multimedia component 610.

So for example, any geometry changes or updates to the client media presentation window such as media presentation window 302 described above in relation to FIGS. 3-4 which are relayed to the client multimedia component 610 are applied to the client media presentation window at the remote desktop. For example, relaying the geometry updates allows a user to click-drag the media player window in the terminal services session and have the resultant movement be accurately reflected at the client by the video presentation moving around to follow the media player window on the remote desktop. Such an example is illustrated and described above in relation to FIGS. 3-4. A more detailed example of geometry tracking is described below under the section titled "geometry tracking". The above described scheme can be repeated for multiple player applications on the server playing within one terminal services session to a terminal services client. In such a case, a single terminal services client multimedia component 610 services the requests of multiple server-side applications.

Figure 7:
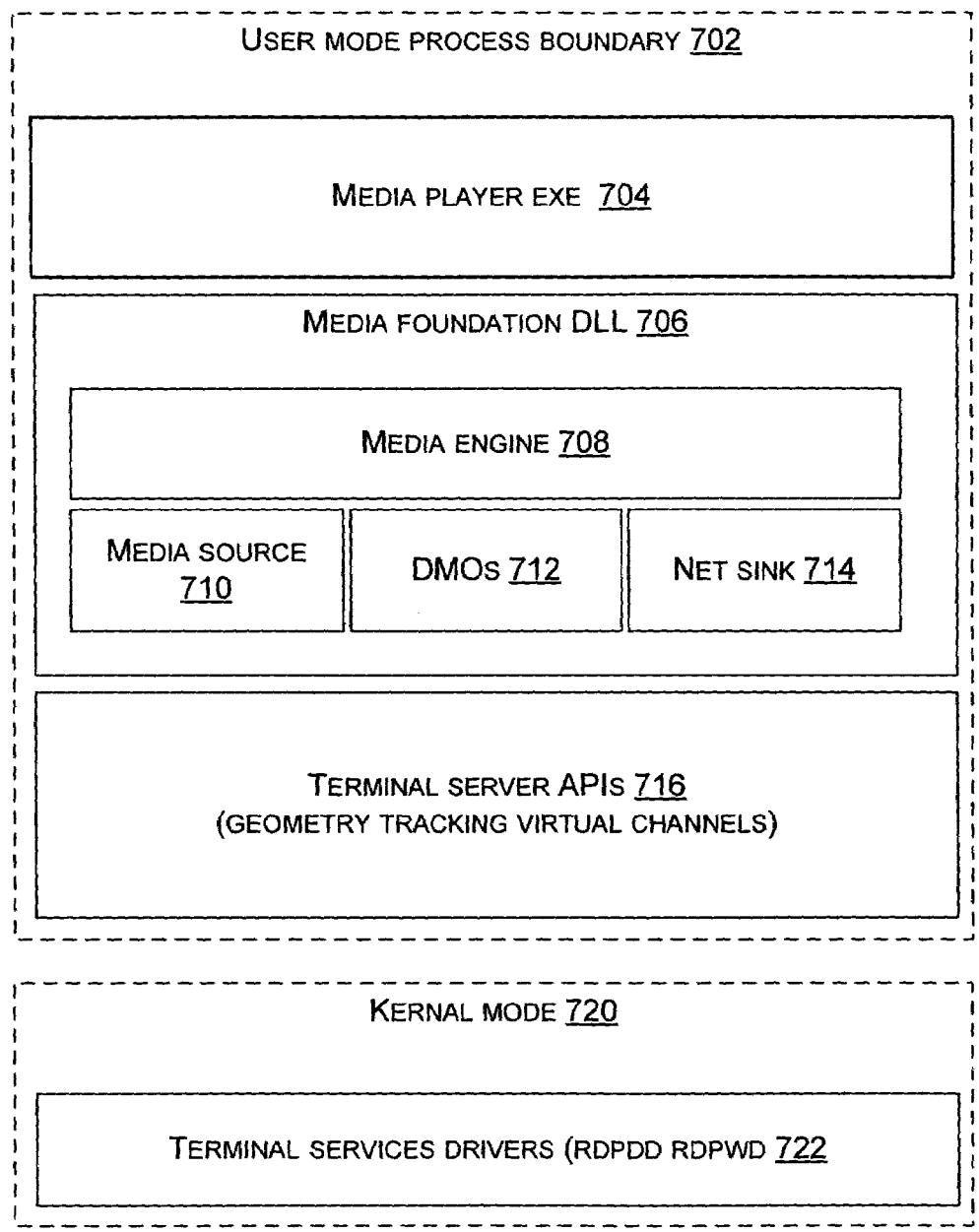
FIG. 7 illustrates a block diagram of one system configuration for managing multimedia transmissions in terminal services scenarios.

FIG. 7 illustrates various levels of abstraction of various system components configured to implement an exemplary terminal services session. In some implementations, this configuration can be employed on both the server and the remote client, such as in a distributed scenario. In a user mode process boundary 702 are a media player 704, a media platform in the form of media foundation 706, and a media engine 708.

Also within the user mode process boundary 702 are a media source 710, a directx media object (DMO) 712 and a net sink 714. Media engine 708 serves as a central focal point for media player 704 to participate in a media presentation. A terminal server application program interface 716 also resides within user mode process boundary 702. The terminal server application program interfaces provide geometry tracking virtual channels as are discussed in more detail in relation to a section below under the heading "geometry tracking". In a kernel mode 720 of the operating system occurs terminal services drivers 722. Specifically, the terminal services drivers relate to a remote desktop display device (RDPDD) and a remote desktop winstation driver (RDPWD). An exemplary system configuration which can support the above described components is described below in relation to FIG. 8.

Exemplary System Environment

Figure 8:
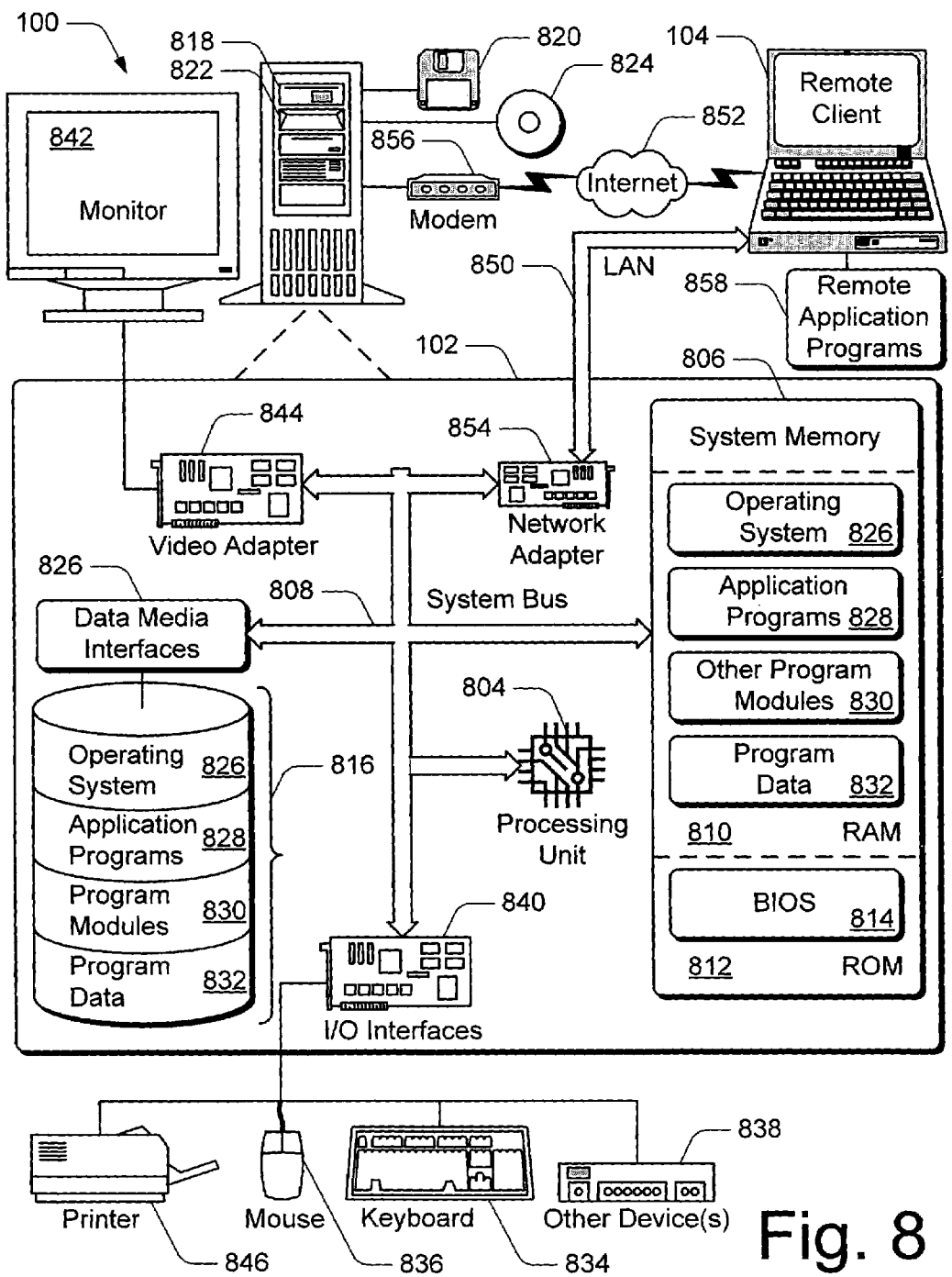
FIG. 8 illustrates exemplary systems, devices, and components in an environment for managing multimedia transmissions in terminal services scenarios.

FIG. 8 represents an exemplary system or computing environment 800 for managing multimedia transmissions to terminal services connections. System environment 800 includes a general-purpose computing system in the form of a server device or server 102. The components of server 102 can include, but are not limited to, one or more processors 804 (e.g., any of microprocessors, controllers, and the like), a system memory 806, and a system bus 808 that couples the various system components. The one or more processors 804 process various computer executable instructions to control the operation of server 102 and to communicate with other electronic and computing devices. The system bus 808 represents any number of several types of bus structures, including a memory bus or memory controller, a peripheral bus, an accelerated graphics port, and a processor or local bus using any of a variety of bus architectures.

Computing environment 800 includes a variety of computer readable media which can be any media that is accessible by server 102 and includes both volatile and non-volatile media, removable and non-removable media. The system memory 506 includes computer-readable media in the form of volatile memory, such as random access memory (RAM) 810, and/or non-volatile memory, such as read only memory (ROM) 812. A basic input/output system (BIOS) 814 maintains the basic routines that facilitate information transfer between components within server 102, such as during start-up, and is stored in ROM 812. RAM 810 typically contains data and/or program modules that are immediately accessible to and/or presently operated on by one or more of the processors 804.

Server 102 may include other removable/non-removable, volatile/non-volatile computer storage media. By way of example, a hard disk drive 816 reads from and writes to a non-removable, non-volatile magnetic media (not shown), a magnetic disk drive 818 reads from and writes to a removable, non-volatile magnetic disk 820 (e.g., a "floppy disk"), and an optical disk drive 822 reads from and/or writes to a removable, non-volatile optical disk 824 such as a CD-ROM, digital versatile disk (DVD), or any other type of optical media. In this example, the hard disk drive 816, magnetic disk drive 818, and optical disk drive 822 are each connected to the system bus 808 by one or more data media interfaces 826. The disk drives and associated computer readable media provide non-volatile storage of computer readable instructions, data structures, program modules, and other data for server 102.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, application programs 828, other program modules 830, and program data 832 (or some combination thereof) may include an embodiment of the systems and methods described herein.

A user can interface with server 102 via any number of different input devices such as a keyboard 834 and pointing device 836 (e.g., a "mouse"). Other input devices 838 (not shown specifically) may include a microphone, joystick, game pad, controller, satellite dish, serial port, scanner, and/or the like. These and other input devices are connected to the processors 804 via input/output interfaces 840 that are coupled to the system bus 808, but may be connected by other interface and bus structures, such as a parallel port, game port, and/or a universal serial bus (USB).

A monitor 842 or other type of display device can be connected to the system bus 808 via an interface, such as a video adapter 844. In addition to the monitor 842, other output peripheral devices can include components such as speakers (not shown) and a printer 846 which can be connected to server 102 via the input/output interfaces 840.

Server 102 can operate in a networked environment using logical connections to one or more remote computers, such as remote client device or client 104. By way of example, the remote client 104 can be a personal computer, portable computer, a server, a router, a network computer, a peer device or other common network node, and the like. The remote client 104 is illustrated as a portable computer that can include many or all of the elements and features described herein relative to server 102.

Logical connections between server 102 and the remote client 104 are depicted as a local area network (LAN) 850 and a general wide area network (WAN) 852. Such networking environments are commonplace in offices, enterprise-wide computer networks, intranets, and the Internet. When implemented in a LAN networking environment, the server 102 is connected to a local network 850 via a network interface or adapter 854. When implemented in a WAN networking environment, the server 102 typically includes a modem 856 or other means for establishing communications over the wide area network 852. The modem 856, which can be internal or external to server 102, can be connected to the system bus 808 via the input/output interfaces 840 or other appropriate mechanisms. The illustrated network connections are exemplary and other means of establishing communication link(s) between the computing devices 802 and 848 can be utilized.

In a networked environment, such as that illustrated with computing environment 800, program modules depicted relative to the server 102, or portions thereof, may be stored in a remote memory storage device. By way of example, remote application programs 858 are maintained with a memory device of remote client 104. For purposes of illustration, application programs and other executable program components, such as the operating system 826, are illustrated herein as discrete blocks, although it is recognized that such programs and components reside at various times in different storage components of the server 102, and are executed by the processors 804 of the server.

Geometry Tracking

An example of but one implementation of a geometry tracking technique for use in managing multimedia transmissions to terminal services connections is described below.

Architecture—Deployment Level (Physical) View of the System

Geometry tracking consist of three different components. There is a server side component, the RDP Display Device (RDPDD) driver, and a client side component.

The server component is responsible for the registration of window tracking. The RDPDD driver is responsible for detecting geometry changes, and transmitting new geometry information to the client. The client component is responsible for delegating geometry change notifications to geometry notify sinks.

Geometry Tracking-Specific Server Components

TSGEOTRACK.LIB

The TSGeoTrack static library provides the server side geometry tracking component. It provides the necessary classes to register a window with geometry tracking. Distributed media foundation (DMF) should statically link to this library. DMF is an example of a media platform remoting technology, such as can be employed by the Media Foundation media platform. The library is published cross-depot in the termsrv depot, so getting access to it should not be a problem.

Geometry Tracking-Specific Client Components

RDPMM Plugin

The RDPMM plugin is the multimedia plugin for the terminal services (TS) client. The RDPMM plugin receives geometry change notifications from the RDPDD driver, and propagates them to the appropriate notification sink on the DMF client. The RDPMM plugin will be statically linked to the TS client.

MM Plugin

The multimedia (MM) plugin is a sink plugin for RDPMM. The MM plugin will host the geometry notify sinks. It has to be implemented as a DLL and registered in an appropriate manner. RDPMM will automatically load this DLL when multimedia capabilities are required. The MM plugin dynamic link library (DLL) has to implement a specific entry point method in order for RDPMM to initialize it.

Media foundation (MF) can use the MM plugin to the DMF client within the TS Client Core. MF has to register itself as an MM plugin and implement the required entry point method.

Supporting Server Components External to Geometry Tracking

DMF Server

The DMF server will be the component that requests the tracking of specific windows.

RDPDD.DLL

RDPDD.DLL is the RDP Display Device driver library. Provides the facility of generating geometry change events and transporting them to the client.

Supporting Client Components External to Geometry Tracking

DMF Client

The DMF client will provide geometry notify sinks that will be registered with the RDPMM plugin. This component will actually be seen by RDPMM as the MM plugin.

MSTSCAX.DLL

The MSTSCAX.DLL is an ActiveX version of the TS RDP client application.

Architecture—Architectural Component Interaction

Geometry Tracking and Notification Sink Registration

TABLE 1

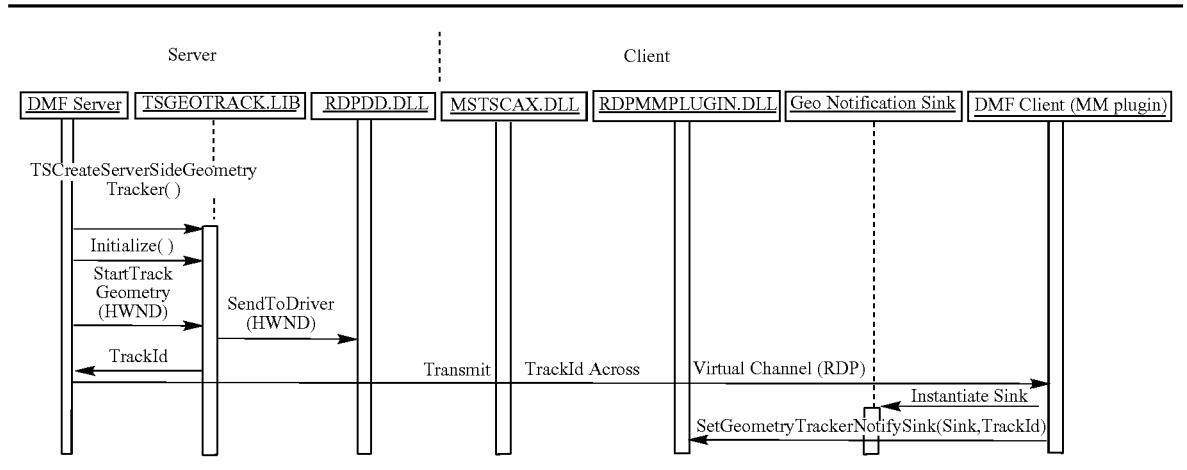

Table 1 describes the communication sequence involved in registering for track events of a window. DMF plays an important role in this process, as it transmits the track ID of the window from its server component to its client component and register a sink for it. This entire process must be repeated in order to track another window.

Geometry Change

ITSServerGeometryTracker

ITSServerGeometryTracker is an interface that provides the necessary methods to start, and stop geometry tracking, and register allow the registration of windows to be tracked. This interface should only be used to track server side windows.

TABLE 2

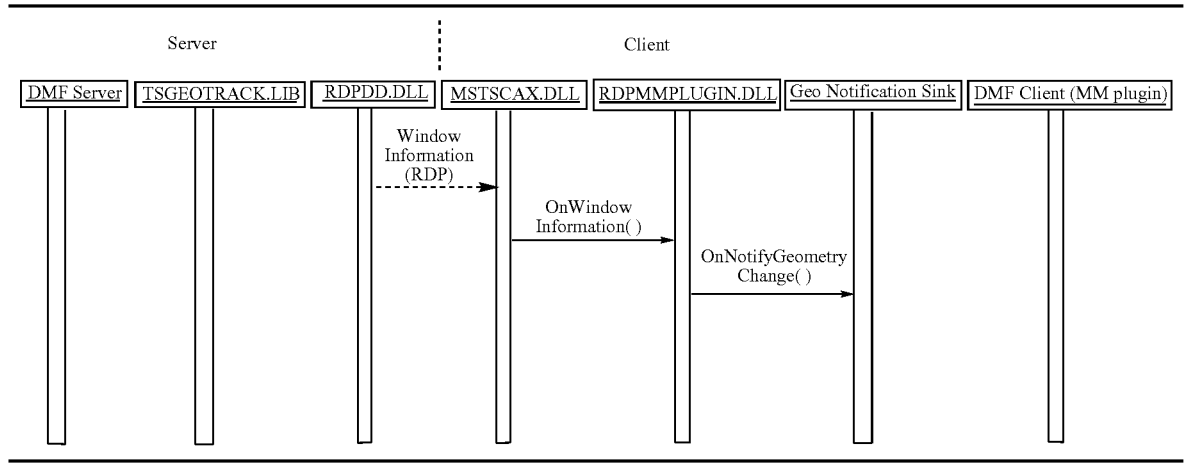

Table 2 describes the communication sequence involved when a window that is registered for geometry tracking, changes its geometry.

Class/Module Relationships

Server Side Geometry Tracking Interface

ITSServerGeometryTracker is the server side geometry tracking interface. It provides the methods that are needed to initialize geometry tracking, and register windows for tracking.

TSGEOTRACK.LIB provides an implementation of this interface through CTSServerGeometryTracker. User's of geometry tracking should use CTSServerGeometryTracker through the ITSServerGeometryTracker interface.

TABLE 3

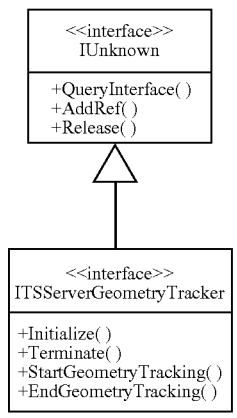

Initialize
Terminate
StartGeometryTracking
EndGeometryTracking

Initialize
The initialize method is responsible for initializing the geometry tracker.
public virtual HRESULT Initialize( )

| Parameters | |
|---|---|
| Returns | S_OK if success, appropriate error otherwise |

Terminate
The Terminate method is responsible for terminating the geometry tracker.
public virtual HRESULT Terminate( )

| Parameters | |
|---|---|
| Returns | S_OK if success, appropriate error otherwise |

Start Geometry Tracking
The StartGeometryTracking method registers a window for geometry tracking. This method registers the given window with the RDPDD driver for geometry tracking notifications. This method will return a track ID to the caller. The track ID is a unique identifier for the particular registration that can be used to register a notification sink for geometry events from the window and to stop tracking itself.
The track ID is actually the HWND of the server side window that is being tracked.
public virtual HRESULT StartGeometryTracking( IN HWND hwndToTrack, IN DWORDdwTrackFlags, OUT DWORD* pdwTrackId)

| Parameters | |
|---|---|
| hwndToTrack | The HWND of the server side window to track |
| dwTrackFlags | Special tracking instructions |
| pdwTrackId | The track ID of the registered window |
| Returns | S_OK if success, appropriate error otherwise |

End Geometry Tracking

The EndGeometryTracking method unregisters a window for geometry tracking. This method unregisters the given window with the RDPDD driver for geometry tracking notifications.

public virtual HRESULT EndGeometryTracking( IN HWND hwndToTrack, IN DWORD dwTrackId)

| Parameters | |
|---|---|
| hwndToTrack | The HWND of the server side window unregister for tracking |
| pdwTrackId | The track ID of the window to unregistered (as returned from StartGeometryTracking) |
| Returns | S_OK if success, appropriate error otherwise |

Server Side Geometry Tracker Implementation

TABLE 4

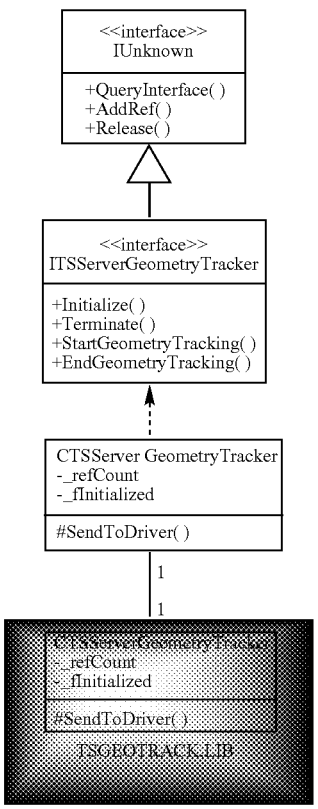

CTSServerGeometryTracker

The CTSServerGeometryTracker class provides the implementation of window tracking registration. CTSServerGeometryTracker also implements the IUnknown interface to provide reference counting. When windows are registered for geometry tracking, the CTSServerGeometryTracker class registered the given window with the RDPDD driver.

_refCount
fInitialized
GetServerSideGeometryTracker( )
SendToDriver( )

refCount

_refCount is the reference count associated to an instance of CTSServerGeometryTracker.

private BOOL _refCount fInitialized fInitialized is a flag that keeps track if an instance of CTSServerGeometryTracker is initialized. No operations will be allowed to be performed on an instance of CTSServerGeometryTracker until it has be initialize by calling the Initialize( ) method.

private BOOL _fInitalized

SendToDriver

The SendToDriver method is used to register and unregister for geometry tracking events with the RDPDD driver. The SendToDriver method is written in a generic way, and can be used to send other commands to the RDPDD driver.

protected virtual HRESULT SendToDriver( IN INT nEscapeCode, IN INT nSizeData, IN LPCSTR pData)

| Parameters | |
|---|---|
| nEscapeCode | The driver operation to perform (for tracking the value should be WNDOBJ_SETUP) |
| nSizeData | The size, in bytes, of the buffer provided by pData |
| pData | Buffer containing setup data for operation. Should point to WNDOBJ_SETUP_DATA structure. Flags field of WNDOBJ_SETUP_DATA should be set to: WNDOBJ_SETUP_FLAG_CREATE \| WNDOBJ_SETUP_FLAG_TRACK - for registration WNDOBJ_SETUP_FLAG_STOPTRACK - for unregisteration |
| Returns | S_OK if success, appropriate error otherwise |

RDP Multimedia Plugin Host Interface

In order to be a multimedia plugin on the TS client, the ITSMultimediaPluginHost interface must be implemented.

The RDPMM plugin is an implementation ITSMultimediaPluginHost.

TABLE 5

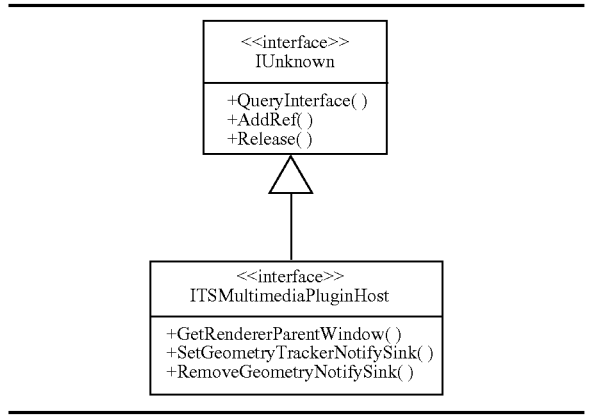

ITSMultimediaPluginHost
ITSMultimediaPluginHost is an interface implemented on the client side that provides the necessary methods to register and unregister a geometry tracking notification sink, and to get to a handle to the renderer's parent window.
  GetRendererParentWindow
  SetGeometryTrackerNotifySink
  RemoveGeometryTrackerNotifySink Get Renderer Parent Window
GetRendererParentWindow returns a handle to the renderer's parent window.
  public virtual HWND GetRendererParentWindow( )

| Parameters | |
|---|---|
| Returns | HWND of renderer's parent window |

SetGeometryTrackerNotifySink
SetGeometryTrackerNotifySink registers the given geometry tracker notification sink. Whenever notifications with the given track ID arrive at the RDPMM plugin, they will be forwarded to the registered sink. If a track ID is registered more than once, this method will return an error.
  public virtual HRESULT SetGeometryTrackerNotifySink( IN DWORD dwTrackId, IN ITSMultimediaGeometryNotifySink *pGeometryNotifySink)

| Parameters | |
|---|---|
| dwTrackId | The track ID of the window that will generate events at the given sink |
| pGeometryNotifySink | Pointer to the geometry notification sink that will handle notifications from the given track ID |
| Returns | S_OK if success, appropriate error otherwise |

RemoveGeometryTrackerNotifySink
RemoveGeometryTrackerNotifySink unregisters the given geometry tracker notification sink. Whenever notifications with the given track ID arrive at the RDPMM plugin, they will be forwarded to the registered sink.
  public virtual HRESULT RemoveGeometryTrackerNotifySink IN DWORD dwTrackId, IN ITSMultimediaGeometryNotifySink *pGeometryNotifySink)

| Parameters | |
|---|---|
| dwTrackId | The track ID of the sink to remove |
| pGeometryNotifySink | Pointer to the geometry notification sink to remove |
| Returns | S_OK if success, appropriate error otherwise |

Window Information Implementation

TABLE 6

| CRDPMMWindowInformation |
|---|
| #_pGeomtryNotifySink<br>#_dwTrackId<br>#_fWindowVisible<br>#_rcLastSetRegion<br>#_fPendingGeomtryUPdate<br>+GetMFPluginNotifySink( )<br>+GetTrackId( )<br>+IsWindowVisiible( )<br>+SetWindowVisible( )<br>+GetRcLastSetRegion( )<br>+SetRcLastSetRegion( )<br>+IsUpdatePending( )<br>+SetUpdatePending( ) |

CRDPMMWindowInformation
CRDPMMWindowInformation is a utility class that stores information regarding a window. CRDPMMWindowInformation holds a pointer to the corresponding notification sink, track ID, the latest clipping region and rectangle. This class has no relationship with ITSWindowInformation.
  _pGeomtryNotifySink
  _dwTrackId
  _fWindowVisible
  _rcLastRect
  _rgnLastSetRegion
  GetGeometryNotifySink
  SetGeometryNotifySink
  GetTrackId
  IsWindowVisible
  Set Window Visible
  GetLastRect
  SetLastRect
  GetLastSetRegion
  SetLastSetRegion spGeomtryNotifySink
_spGeomtryNotifySink is a smart pointer to the geometry tracking notification sink corresponding to the particular window.
  ProtectedITSMultimediaGeometryNotifySink _spGeomtryNotifySink dwTrackId
_dwTrackId is the track ID of the particular window.
  protected DWORD _dwTrackId fWindowVisible
_fWindowVisible is a flag that specifies whether the window is visible or not. If the window is visible, this value will be TRUE, otherwise it will be false.

Note: this value does not set the visibility of the window, but holds the value of the current state of the window.
  protected DWORD _fWindowVisible rcLastRect
  _rcLastRect represents the last rectangle the particular window occupied.
  protected RECT _rcLastRect rgnLastRegion
  _rgnLastRegion represents the last clipping region the particular window occupied.
  protected CTSRegion _rgnLastRegion GetGeometryNotifySink
  GetGeometryNotifySink returns a pointer to the geometry notification sink for this particular window. If there is no sink associated the particular window, this method will return NULL.
  public virtual ITSMultimediaGeometryNotifySink GetGeometryNotifySink( )

| Parameters | |
|---|---|
| Returns | Pointer to geometry notification sink. If no sink is associated, NULL is returned. |

SetGeometryNotifySink
  SetGeometryNotifySink sets the geometry notification sink for the particular window. Setting the notify sink to a value of NULL means the window has no sink associated with it.
  public virtual HRESULT SetGeometryNotifySink(IN ITSMultimediaGeometryNotifySink*pGeometryNotifySink)

| Parameters | |
|---|---|
| pGeometryNotifySink | Pointer to the geometry notification sink |
| Returns | S_OK if success, appropriate error otherwise |

IsWindowVisible
  IsWindowVisible determines if the window is current visible.
  public virtual BOOL IsWindowVisible( )

| Parameters | |
|---|---|
| pGeometryNotifySink | Pointer to the geometry notification sink |
| Returns | S_OK if success, appropriate error otherwise |

SetWindowVisible
  SetWindowVisible is used to set the current visibility state of the window.
  public virtual HRESULT SetWindowVisible( IN INT fIsVisible)

| Parameters | |
|---|---|
| fVisible | TRUE to for VISIBLE, FALSE for NOT VISIBLE |
| Returns | TRUE if window is visible, and FALSE otherwise |

GetLastRect
  GetLastRect returns the rectangle that the window last occupied.
  public virtual HRESULT GetLastRect(RECT &rc)

| Parameters | |
|---|---|
| rc | Reference to rectangle. The last rect will be stored into the given rectangle. |
| Returns | S_OK if success, appropriate error otherwise |

SetLastRect
  SetLastRect is used to set the rectangle that the window last occupied.
  public virtual HRESULT SetLastRect(RECT &rc)

| Parameters | |
|---|---|
| rc | Reference to a rectangle the window last occupied. |
| Returns | S_OK if success, appropriate error otherwise |

GetLastSetRegion
  GetLastSetRegion returns the clipping region that the window last occupied.
  public virtual HRESULT GetLastSetRegion(CTSRegion &rc)

| Parameters | |
|---|---|
| rc | Reference to region. The last set region will be stored into the given region. |
| Returns | S_OK if success, appropriate error otherwise |

SetLastSetRegion
  SetLastRect is used to set the rectangle that the window last occupied.
  public virtual HRESULT SetLastRect(RECT &rc)

| Parameters | |
|---|---|
| rc | Reference to a region the window last occupied. |
| Returns | S_OK if success, appropriate error otherwise |

Multimedia Plugin Host Implementation

TABLE 7

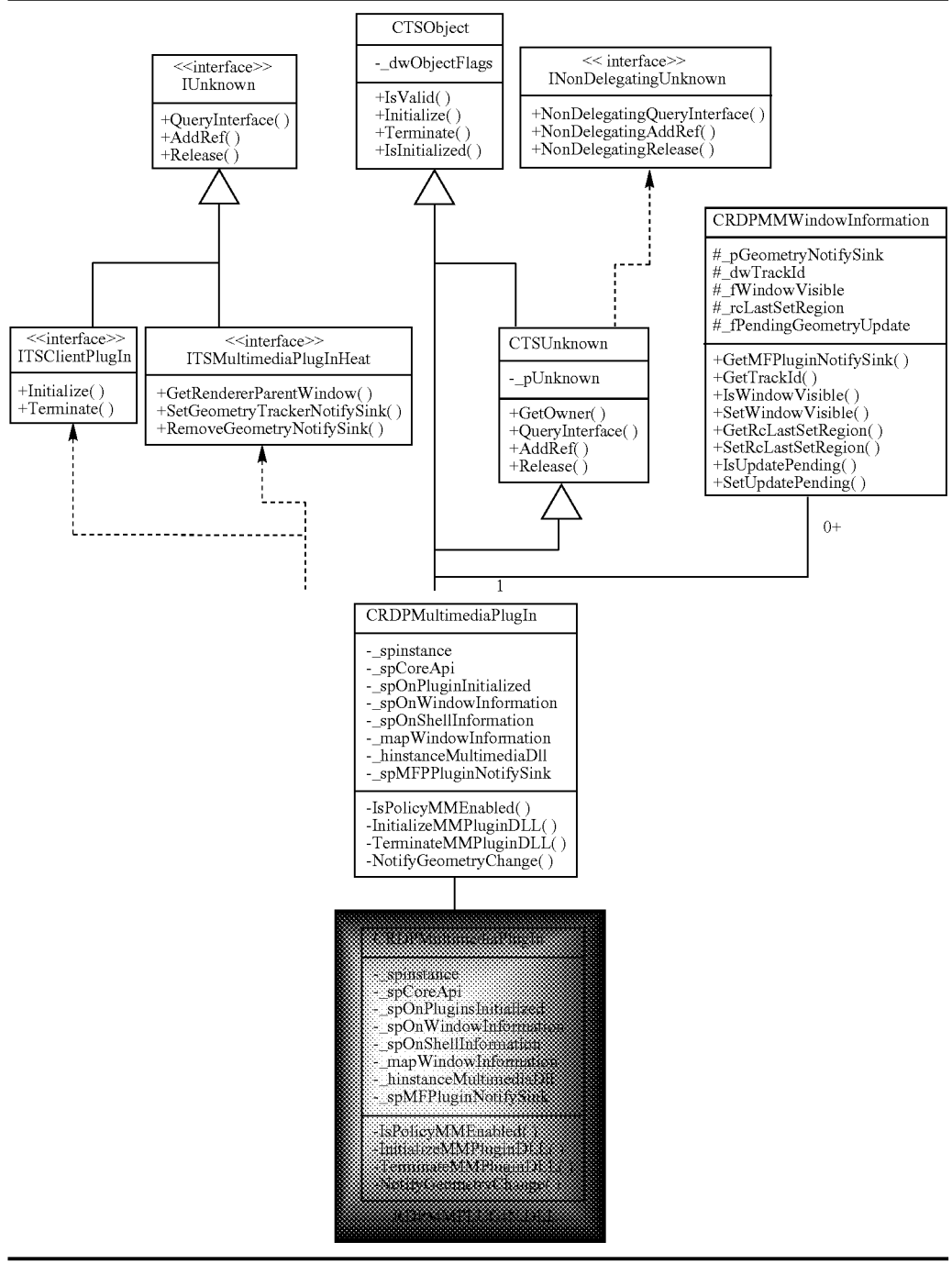

CRDPMultimediaPlugin
   CRDPMultimediaPlugin is the implementation of the RDP Multimedia plugin. It implements ITSClientPlugin so it can be a TS Client plugin, ITSMultimediaPluginHost so that it can handle geometry tracking. This class provides mechanism for the DMF client to register geometry notify sinks.
   _spInstance
   _spCoreApi
   _spOnPluginInitialized
   _spOnWindowInformation
   _spOnShellInformation
   _mapTrackIdSink
   _mapWindowInformation
   _hInstanceMultimediaDll
   _spPluginNotifySink
   NotifyGeometryChange( )
   IsPolicyMMEnabled( )

InitializeMMPluginDLL( )
TerminateMMPluginDLL( )

spnInstance
    spInstance is a pointer to an instance of TS Client.
    private ComSmartPtr<ITSInstance>_spInstance spCoreApi
    _spCoreApi is a pointer to the TS Core API. The Core API is needed to register for notifications (of all types).
    private ComSmartPtr<ITSCoreApi>_spCoreApi spOnPluginInitialized
    spOnPluginInitialized is a pointer to the plugin initialization notification sink. The OnPluginnitialized event handler will be called when the MF plugin is initialized.
    privateComSmartPtr<ITSCoreEventSink>_spOnPluginInitialized spOnWindowInformation
    spOnWindowInformation is a pointer to the window information notification sink. The OnWindowInformation event handler will be called when a window information event is received. Window information events can be geometry tracking events.
    PrivateComSmartPtr<ITSCoreEventSink>_sponWindowInformation spOnShellInformation
    spOnShellInformation is a pointer to the shell information notification sink. The OnShellInformation event handler will be called when a shell information event is received. Window information events can be geometry tracking events.
    private ComSmartPtr<ITSCoreEventSink>_sponShellInformation mapWindowInformation
    mapWindowInformation is a hash table that maps a track ID to window information about the corresponding window. This structure can be used to look up a sink for a given track ID. The current window properties will also be stored.
    privateCRDPMMHashTable<DWORD,CRDPMMWindowInformation _mapWindowInformation hInstanceMultimediaDll
    hInstanceMultimediaDll is a handle to the MF plugin for the TS client.
    private HANDLE _hInstanceMultimediaDll spMFPluginNotifySink
    spMFPluginNotifySink is pointer to the plugin notification sink for the MF plugin. Notifications generated by the MF plugin will arrive at this sink.
    private ComPlainSmartPtr<ITSMultimediaPluginNotifySink>_spMFPluginNotifySink;

NotifyGeometryChange
    NotifyGeometryChange is a utility method that accepts the geometry information of a window, and generates a geometry tracking notification at the appropriate sink. This method uses the track ID sink map to find the appropriate sink given a track ID of the window.
    private HRESULT NotifyGeometryChange( IN DWORD dwTrackId, IN HRGN hrgnNew, IN RECT rc)

| Parameters | |
| --- | --- |
| dwTrackId | Track ID of window that generated event |
| hrgnNew | New clipping region of window |
| rc | Rectangle that the window encompasses |
| Returns | S_OK if success, appropriate error otherwise |

IsPolicyMMEnabled
    IsPolicyMMEnabled is a utility method that determines whether the MF plugin should be loaded. The MF plugin will be loaded if the EnableMedia policy is set. This method checks with the registry to determine if EnableMedia policy is set.

Please refer to the registry section of this document to find the necessary keys that need to be set.
    private BOOL IsPolicyMMEnabled( )

| Parameters | |
| --- | --- |
| Returns | TRUE if EnableMedia policy is set, FALSE otherwise |

InitializeMMPluginDLL
    InitializeMMPluginDLL is a utility method that loads the MF plugin. The MF plugin must be registered as the MM plugin in the registery.

Please refer to the registry section of this document to find the necessary keys that need to be set.
    private HRESULT InitializeMMPluginDll( )

| Parameters | |
| --- | --- |
| Returns | S_OK if success, appropriate error otherwise |

TerminateMMPluginDLL
    TerminateMMPluginDLL is a utility method that unloads the MF plugin. This method also removes all geometry notification sinks that have been registered. The plugin notification sink is also removed.

private HRESULT TerminateMMPluginDll( )

| Parameters | |
| --- | --- |
| Returns | S_OK if success, appropriate error otherwise |

Geometry Notify Sink Interface

TABLE 8

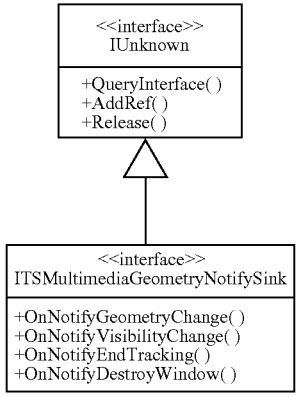

The geometry notify sink interface should be implemented by anyone that wants to receive geometry change notifications. The MF plugin should have an implementation of this interface.

OnNotifyGeometryChange
OnNotifyVisibilityChange
OnNotifyEndTracking
OnNotifyDestroyWindow OnNotifyGeometryChange OnNotifyGeometryChange is a method that is invoked when a windows geometry changes. The windows new geometry (rectangle and clipping region) will be given to this method.
 private HRESULT OnNotifyGeometryChange( IN HRGN hrgnUpdatedVizRegion, IN LPRECT prcBoundingRect)

| Parameters | |
|---|---|
| hrgnUpdatedVizRegion | The window's new clipping region |
| prcBoundingRect | The rectangle that the window is contained in |
| Returns | S_OK if success, appropriate error otherwise |

OnNotifyVisibilityChange

OnNotifyVisibilityChange is a method that is invoked when a windows visibility is changed.
 private HRESULT OnNotifyGeometryChange( IN BOOL fVisible)

| Parameters | |
|---|---|
| fVisible | TRUE if the window is now visible, FALSE otherwise |
| Returns | S_OK if success, appropriate error otherwise |

OnNotifyEndTracking

OnNotifyEndTracking is a method that is invoked when the server requests that the window no longer be tracked. No further events will be passed to this sink once this method has been called.
 private HRESULT OnNotifyEndTracking( )

| Parameters | |
|---|---|
| Returns | S_OK if success, appropriate error otherwise |

OnNotifyDestroyWindow

OnNotifyEndTracking is a method that is invoked when the server wants the window destroyed.
 private HRESULT OnNotifyDestroyWindow( )

| Parameters | |
|---|---|
| Returns | S_OK if success, appropriate error otherwise |

Class/Module Interaction

Notification Threading Model

All geometry change notifications will occur on the RDPMM thread. The RDPMM plugin notifies the MM plugin of geometry changes by directly invoking the methods defined in the ITSMultimediaGeometryNotifySink interface.

Managing the Window Information Map

The RDPMM will manage geometry notifications through a map containing CRDPMMWindowInformation objects. The entries in the map can be partially filled, meaning that they only contain partial information regarding the window. Either the notification sink, or the window's geometry information could be missing. The notification sink could be missing because the MM plugin has yet to register a sink for the window. The geometry information could be missing if RDPMM has yet to receive any geometry information for the window.

Entries in the map can be added in one of two ways:
 1. The MM plugin explicitly registers a notification sink for a track ID.
 2. The TS client core sends RDPMM a geometry change notification for a track ID that has no sink registered for it.

The following algorithm is followed during when the MM plugin registers a notification sink with RDPMM:
 1. Look up given track ID in window information map.
 2. If entry is found go to step 4.
  a. If an entry was found then it must have been added by some geometry information that RDPMM received in the past or have already registered a sink for it.
 3. Create a map entry.
 4. Check to see if entries sink pointer has already been set. If it has been set return a duplicate registration error to the caller.
  a. We do not support the re-registration of track IDs (the sink has to be explicitly removed first).
 5. Set sink pointer of entry to given sink.

The following algorithm is followed when the RDPMM receives geometry information:
 1. Look up given track ID in window information map.
 2. If entry is found go to step 4.

a. If no entry is found that means there is no sink registered to it, and this is the first update we have received for this window.
3. Create a map entry.
4. Update entries geometry information.
Entries in the map can be removed in two ways:
1. The MM plugin explicitly unregisters a notification sink for a track ID.
2. The TS client core notifies RDPMM that a window has been deleted.

MF's Role in Transporting the Track ID

MF plays an important role in transporting the track ID from the DMF server to the DMF client. In order to register a window for tracking, it must be registered with the server side geometry tracker, and then a notification sink must be set up with the RDPMM which lives on the client.

The server side geometry tracker will return a track ID to the DMF server upon registration. In order for the DMF client to set up the notification sink with RDPMM, the DMF server must communicate the track ID to the DMF client. This should be done through virtual channels.

The geometry tracking system can tolerate a delay between window registrations on the server side and sink registrations client side. RDPMM will maintain updates from a window that has no sink associated, so that when the sink is eventually registered, the latest information will be immediately available.

Geometry Tracking and Notification Sink Registration Sequence

TABLE 9

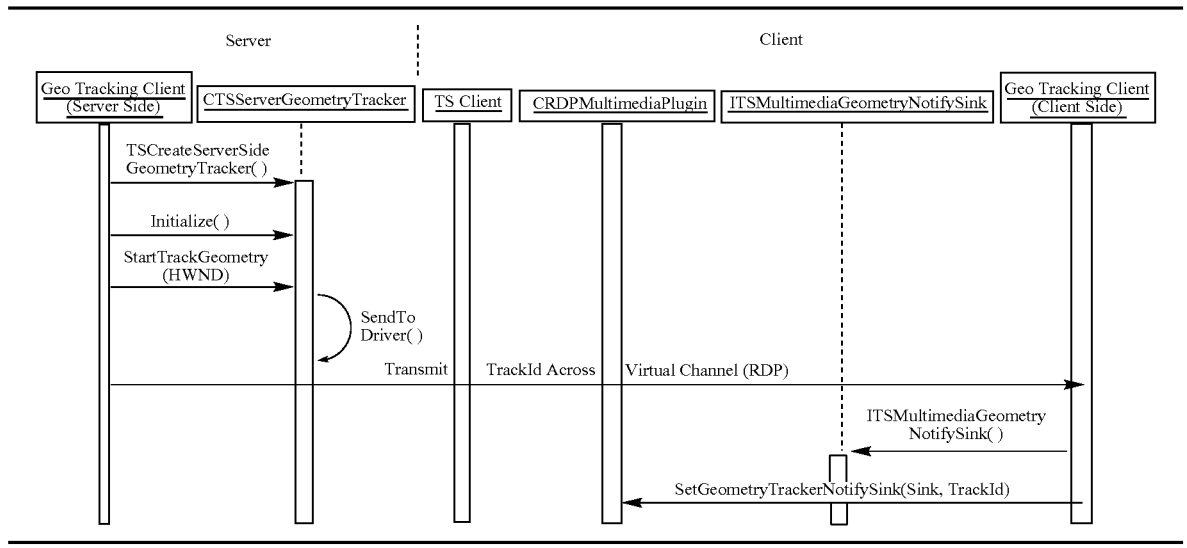

The above sequence of table 9 describes the object communication flow during geometry tracking and notification sink registration.

Geometry Tracking and Notification Sink Registration Sequence

TABLE 10

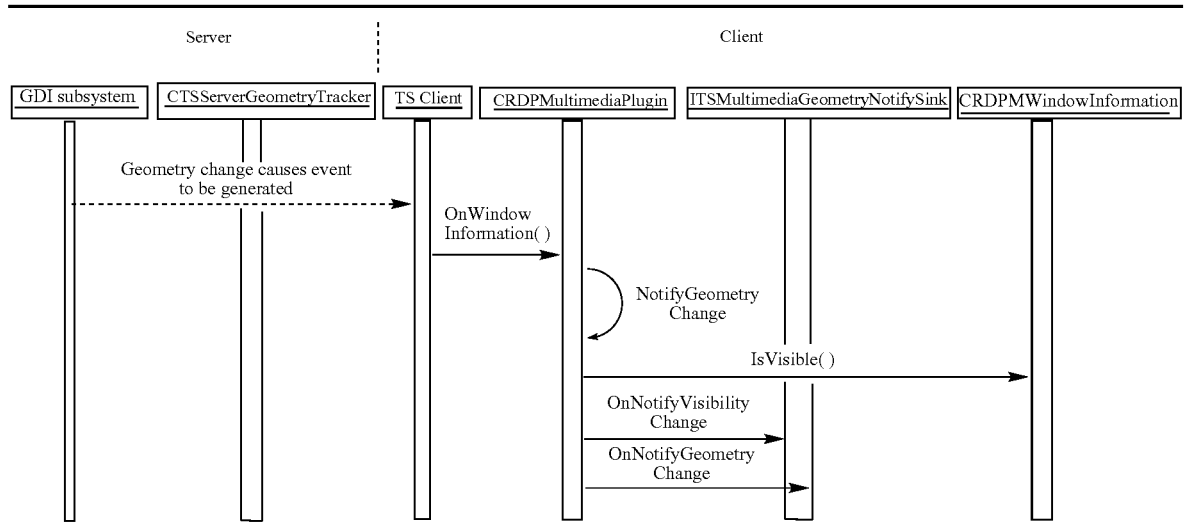

The above sequence of Table 10 describes the object communication flow during geometry change notification when the visibility of the window does not change.

Geometry Change Notification Sequence

TABLE 11

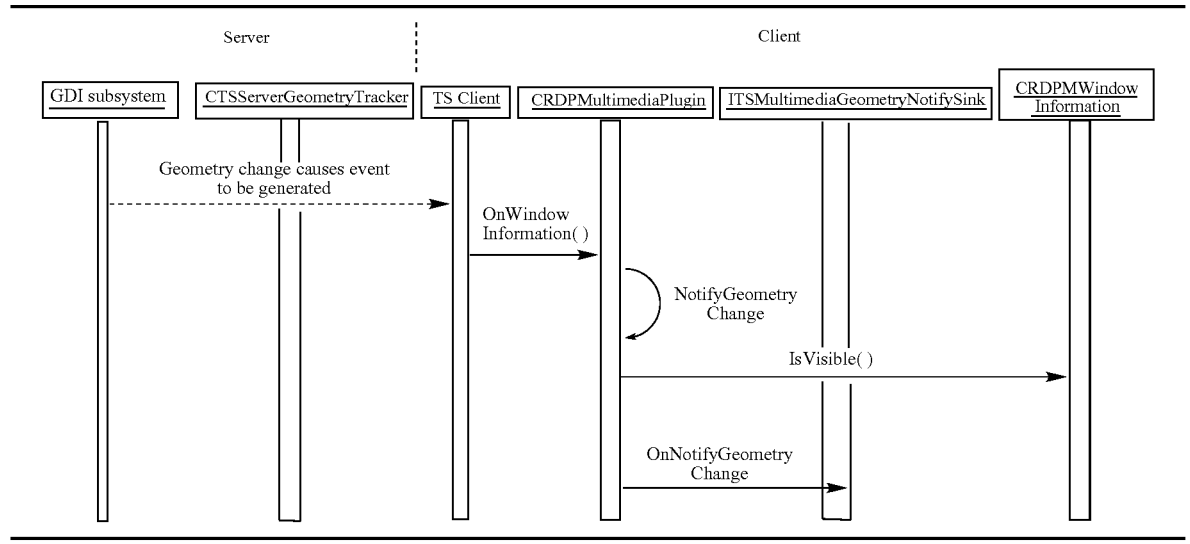

The above sequence of table 11 describes the object communication flow during geometry change notification when visibility of the window changes from invisible to visible.

TABLE 12

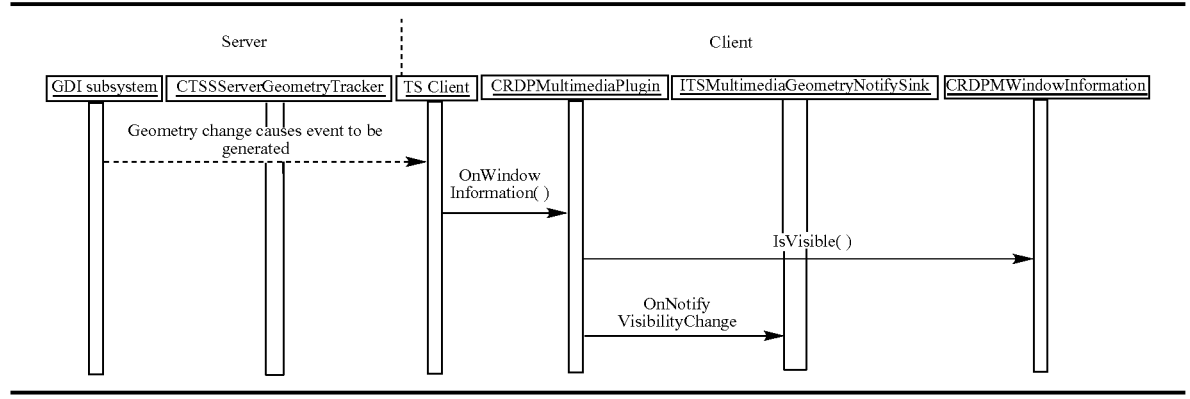

The above sequence of table 12 describes the object communication flow during geometry change notification when visibility of the window changes from visible to invisible.

Named Objects

Obtaining a Reference to the Server Side Geometry Tracker

A global method is provided to get a reference of the geometry tracker. This method is responsible for the construction and the destruction of the geometry tracker.

The method has the following prototype:
HRESULT TSCreateServerSideGeometryTracker( OUT ITSServerGeometryTracker** ppGeoTracker)

The return value is S_OK if successful, otherwise an appropriate error code.

This method will be exposed in TSGEOTRACK.LIB.

This section provides but one example for achieving geometry tracking of a media presentation consistent with the concepts described above and below.

Exemplary Methods

FIG. 9 illustrates an exemplary method 900 for remote desktop presentation tracking. The order in which the method is described is not intended to be construed as a limitation, and any number of the described method blocks can be combined in any order to implement the method. Furthermore, the method can be implemented in any suitable hardware, software, firmware, or combination thereof.

At block 902, on the server side, the method sends a user-interface component of a server desktop during a terminal services session. In one instance the user-interface component simply comprises an application window, such as media player window. In another instance, the user-interface component comprises a server desktop. For instance a server desktop may include one or more icons and one or more toolbars superimposed over a background image. One or more windows may be open on the server desktop. The user-interface component is sent over a network channel established by the terminal services session.

At block 904, the method receives the user-interface component at the client side during the terminal services session.

At block 906, on the server side the method streams media to the client. The media is streamed responsive to receiving, from the remote client, a media presentation request for a media application on the user-interface component. The media can be streamed over a separate network channel from the interface component. The network channel utilized for streaming the media can be established by the terminal services session or can be established by the method outside of the terminal services session. The media is streamed in a compressed or only partially processed format to the client. In some instances the method negotiates between the server and the client to determine what media formats are supported by the client. If the media is accessed in a format which is not supported by the client then the method may decode the media and re-encode the media into a format supported by the client before streaming the media to the client.

At block 908, on the client side, the method accepts the media stream corresponding to the media presentation request. The media can be processed such as by one or more transforms before being rendered on the client. In at least some methods, the components at the source which process the media need not be aware of the terminal services session to achieve their functionalities.

At block 910, on the client side the method generates a remote desktop experience by combining a media presentation with the user-interface component. The media presentation is generated from the streamed media. In some instances, the media may be presented in a window within an application window. For instance, the media may be presented in a media presentation window within a media player window.

At block 912, on the server side the method tracks presentation of the media on a remote desktop at the remote client without presenting the media on the server desktop. Note that in at least some instances, any changes at the remote desktop are first reflected at the server. The changes to the user-interface are reflected when an updated user-interface is sent to the client. Changes to the media presentation are tracked separately since the media is not actually being presented at the server. The method can assign a unique identifier to a region which acts as a placeholder for the media presentation on the server. In one instance, the unique identifier is assigned to the media presentation window where the media presentation window is represented by the placeholder at the server. Any actions affecting the media presentation window can then be tracked. Such actions can include the user at the remote desktop clicking and dragging the media player window across the remote desktop, the user reducing or enlarging the size of the media player window, and/or other actions. For instance, another window may be opened which clips the media presentation window. Such actions can be tracked at the server and relayed to the client so that the remote desktop can be updated accordingly.

At block 914, on the client side the method acquires geometry updates regarding the media presentation relative to the remote desktop. For instance, if the user clicked and dragged the media player window, then the geometry updates can cause the client to move the media presentation accordingly so that its media presentation window follows the media player window to its new location. In configurations where the server creates a placeholder on the server desktop, the client presents the media on the remote desktop over the placeholder wherever the placeholder moves on the remote desktop Although embodiments relating to managing multimedia transmissions to terminal services connections have been described in language specific to structural features and/or methods, it is to be understood that the subject of the appended claims is not necessarily limited to the specific features or methods described. Rather, the specific features and methods provide examples of implementations for the concepts described above and below.

The invention claimed is:

1. A computer-readable media storing computer-executable instructions that when executed, cause one or more processors to perform acts, comprising:

sending from a server to a remote client a remote desktop representation including a user-interface component and a media application window of a media application, the remote desktop representation representing a server desktop during a terminal services session;

receiving from the remote client a media presentation request for a media application on a media presentation window within a media application window of the remote desktop representation on the remote client;

streaming media from the server to the remote client including information for presentation of the media on the remote client in response to receiving from a remote client the media presentation request for the media application without ever displaying the presentation of the media on the server desktop;

presenting the media application window at the server that is synchronized with the media application window at the remote client;

tracking, at the server, a presentation of the media on the remote desktop at the remote client and user initiated changes to a window display geometry of the media application window on the remote desktop on a remote desktop at the remote client;

changing the window display geometry of the media application window on the server desktop at the server in response to the tracking;

assigning a placeholder to a region of the media application window on the server corresponding to a location of the media application window where the media is presented on the remote desktop at the remote client; and sending notifications from the server to the remote client to change the window display geometry of the presentation of the streaming media on the media presentation window within the media application window on the remote desktop at the remote client in response to the tracking of the user initiated changes to the window display geometry of the media application window at the remote client and in response to changing of the window display geometry of the media application window at the server.

2. A computer-readable media as recited in claim 1, wherein the sending the user-interface component is achieved over a first network channel established by the terminal services session and the streaming of the media is achieved over a second different channel.

3. A computer-readable media as recited in claim 2, wherein the second different channel is established by the terminal services session.

4. A computer-readable media storing computer-executable instructions that when executed, cause one or more processors to perform acts, as recited in claim 1 further comprising:

determining a format of the media prior to the streaming; and evaluating a capacity of the client to decode and render the media in the format.

5. A computer-readable media storing computer-executable instructions that when executed, cause one or more processors to perform acts, as recited in claim 4, further comprising decoding the media and re-encoding the media in a second different format based on changes to the window display geometry of the media application window and in an event that the client lacks a capacity to decode and render the media in the existing format.

6. A computer-readable media storing computer-executable instructions that when executed, cause one or more processors to perform acts, as recited in claim 1 further comprising:

establishing a virtual channel connection with the client in response to the presentation command;

negotiating formats which are supported by both the server and the client in response to the presentation command; and, setting-up a distributed topology with the client in response to the presentation command.

7. A computer-readable media as recited in claim 6, wherein the setting-up a distributed topology comprises inserting a network transmitter at the server and a network receiver at the client.

8. A method, comprising:

sending a user-interface component including a first and a second media application window from a server to a remote client during a terminal services session;

streaming a first and a second media component for presentation in a respective first and second media presentation target window on the remote desktop in combination with the user-interface component, wherein the streaming occurs in the terminal services session;

tracking, at the server, user initiated changes to a window display geometry and a position of the first media application window and the second media application window on the remote desktop, including tracking of a clipping of the first media application window by the second media application window;

relaying to the remote desktop changes in the relative window position of the first and the second media presentation target window relative to changes in the relative window position of the respective first and second media application window such that the first media application window on the client is synchronized with the first media application window on the server;

relaying to the remote client changes in the relative window geometry of the first and the second media presentation target window relative to changes in the relative window geometry of the respective first and second media application window such that the second media application window on the client is synchronized with the second media application window on the server; and streaming a new first and a new second media component from the server to the remote desktop with a changed window display geometry and position corresponding to the user initiated changes for presentation on the remote client in combination with the respective changed first and second media application window without ever presenting the media component in a format for display within the first or the second media presentation window on the server.

9. A method as recited in claim 8, further comprising the first media component is configured to be presented in a media presentation target window within the first media application window.

10. A method as recited in claim 8, wherein the tracking comprises inserting a placeholder on the server which represents one of the media presentation windows and tracking any user initiated changes affecting the placeholder.

11. A method as recited in claim 8 further comprising determining what media formats are supported by the remote client.

12. A method as recited in claim 8 further comprising establishing a distributed topology with the remote client.

13. A computer-readable media comprising computer-executable instructions that, when executed, perform acts, comprising:

during a terminal services session, receiving at a remote desktop representation at a remote client from one or more servers a static user-interface component a media presentation window information and a media component, the remote desktop representation using the media presentation window information to display a media presentation window that is synchronized with a corresponding media presentation window on the one or more servers;

accepting from the one or more servers as part of the media component a media stream;

transmitting in response to a remote desktop generated media presentation request, the media stream being presented in format for display within a media presentation window on the remote desktop without ever being presented in a format for display within the media presentation window on the one or more servers;

generating a remote desktop experience by combining the media presentation window information and the media stream a media presentation with the static user-interface component in the media presentation window;

acquiring user initiated geometry updates to the media presentation window at the remote desktop;

providing the user initiated geometry updates to the one or more servers to change the geometry of the media presentation window on the one or more servers; and receiving, in response to the user initiated geometry updates, at the remote desktop from the server a new media presentation window information and a new media stream, the new media presentation window information including geometry information for the media presentation window corresponding to the acquired geometry updates, the remote desktop using the new media presentation window information to display a new media presentation window that is synchronized with a corresponding new media presentation window on the one or more servers, the new media stream being presented in format for display within the new media presentation window on the remote desktop without ever being presented in a format for display within the media presentation window on the one or more servers.

14. A computer-readable media as recited in claim 13, wherein the acquiring of the user initiated geometry is achieved over a network channel which is not utilized for said receiving or said accepting of the media stream.

* * * * *

UNITED STATES PATENT AND TRADEMARK OFFICE
CERTIFICATE OF CORRECTION

PATENT NO. : 7,590,750 B2  Page 1 of 1
APPLICATION NO. : 11/047362
DATED : September 15, 2009
INVENTOR(S) : Nadim Y. Abdo et al.

It is certified that error appears in the above-identified patent and that said Letters Patent is hereby corrected as shown below:

On the Title Page, change Inventor's Name (spelling)

Page 1, Line 75, change from "Gr<u>o</u>gorovitch"

to "Grigorovitch"

Signed and Sealed this

Fifth Day of January, 2010

David J. Kappos
*Director of the United States Patent and Trademark Office*